United States Patent [19]

Bach

[11] Patent Number: 5,653,273
[45] Date of Patent: Aug. 5, 1997

[54] UNIVERSAL PRECISION WOODWORKING CENTER

[76] Inventor: Emin Nelson Bach, 12891 State Hwy. 122, Somerville, Ohio 45064-9623

[21] Appl. No.: 514,611

[22] Filed: Aug. 14, 1995

[51] Int. Cl.[6] .................... B27C 9/00; B25H 1/00
[52] U.S. Cl. .................... 144/1.1; 29/26 A; 29/560; 144/286.1; 408/20; 408/234; 408/237; 409/206; 409/212; 409/235
[58] Field of Search ................. 108/59, 61, 65, 108/90, 102, 137; 74/25, 107; 29/26 R, 26 A, 27 A, 560; 408/20, 88, 234, 236, 237; 409/105, 212, 216, 235, 241; 144/1.1, 2.1, 3.1, 35.1, 286.1, 286.5

[56] References Cited

U.S. PATENT DOCUMENTS

| | | | |
|---|---|---|---|
| 2,621,686 | 12/1952 | Tompkins | 144/103 |
| 2,672,170 | 3/1954 | Johnson | 144/49 |
| 2,786,498 | 3/1957 | Schankler | 408/124 |
| 2,805,691 | 9/1957 | Medal | 144/1.1 |
| 3,410,326 | 11/1968 | Paquin | 144/1.1 |
| 3,483,904 | 12/1969 | Jacumin | 144/386 |
| 3,835,527 | 9/1974 | Cornair | 29/560 |
| 4,088,417 | 5/1978 | Kosmowski | 408/1 BD |
| 4,153,383 | 5/1979 | de Lanauze | 29/26 A |
| 4,186,784 | 2/1980 | Stone | 144/253.2 |
| 4,265,283 | 5/1981 | Nash et al. | 144/286.5 |
| 4,449,986 | 5/1984 | Held . | |
| 4,497,353 | 2/1985 | Sproat, Jr. | 144/1.1 |
| 4,516,612 | 5/1985 | Wiley | 144/1.1 |
| 4,564,995 | 1/1986 | Kase . | |
| 4,566,169 | 1/1986 | Vesely . | |
| 4,787,127 | 11/1988 | Beall . | |
| 4,945,958 | 8/1990 | Shoda | 144/1.1 |
| 5,174,349 | 12/1992 | Svetlik et al. . | |
| 5,186,228 | 2/1993 | Stafford . | |
| 5,193,257 | 3/1993 | Bowman et al. . | |

*Primary Examiner*—W. Donald Bray
*Attorney, Agent, or Firm*—Frost & Jacobs

[57] ABSTRACT

A woodworking center comprising a horizontal frame supporting a work table assembly at a level comfortable for the operator. For most woodworking operations the workpiece is supported by the work table assembly. The work table assembly can be moved horizontally and with precision between the front and rear of the horizontal frame by an acme screw mechanism and can be locked in any desired position. The woodworking center also includes a head in the form of a carriage and a tool slide assembly mounted thereon. The carriage is located above the work table assembly and is shiftable in a horizontal direction from side to side of the horizontal frame. The carriage may be shifted by hand, or with precision by an acme screw assembly. The carriage is lockable in any desired position along its path of travel. The tool slide assembly is capable of mounting a large variety of portable power hand tools. The tool slide assembly is shiftable vertically with precision by an acme screw assembly and is lockable in any desired position along its path of travel. The carriage, the tool slide assembly, and the work table assembly are capable of accurately and repeatably moving and locating the tooling and the workpiece to accomplish a wide variety of woodworking operations.

36 Claims, 19 Drawing Sheets

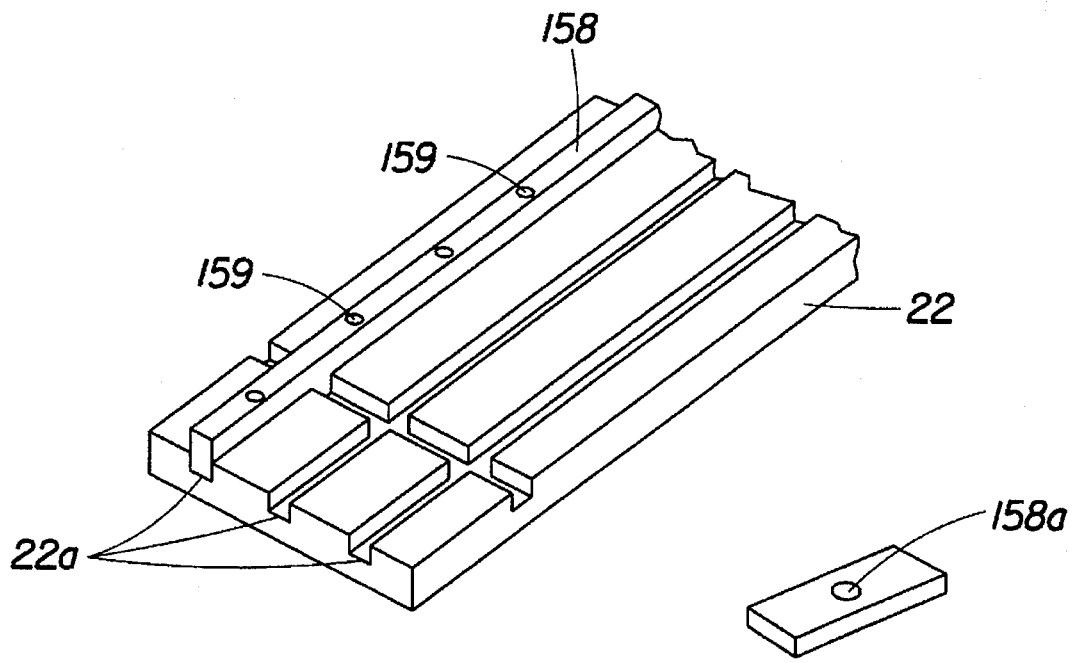
Fig. 16
Fig. 16A
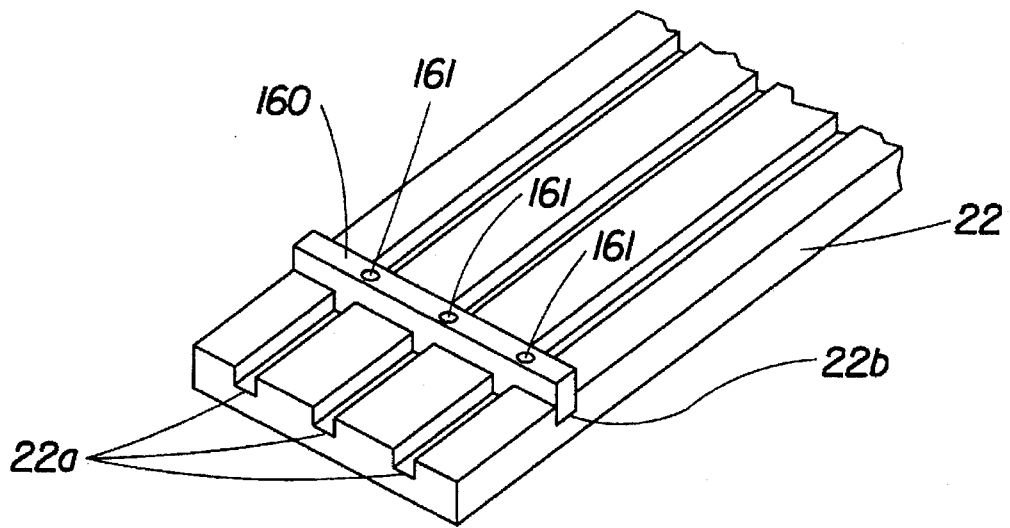
Fig. 17

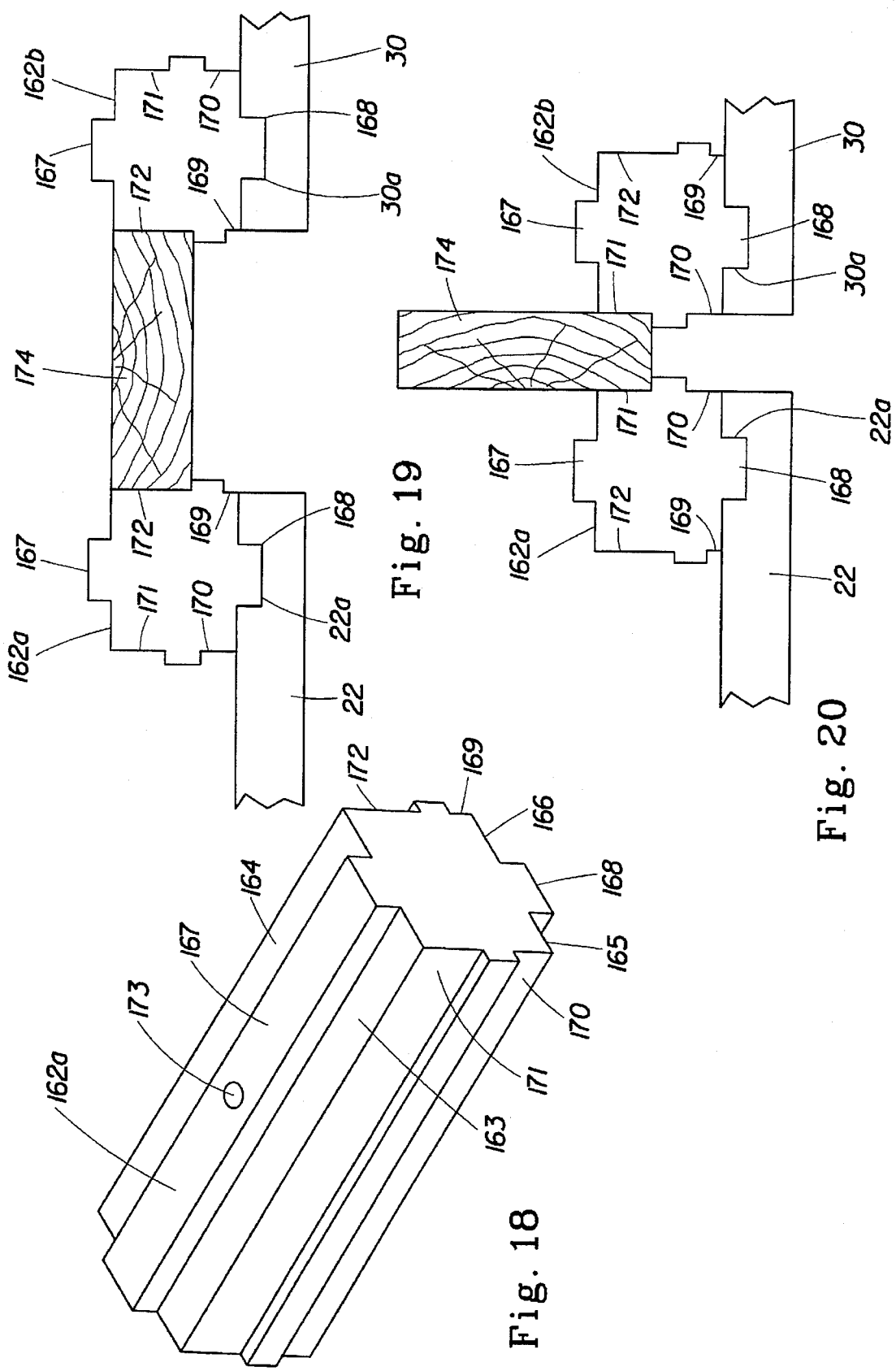

UNIVERSAL PRECISION WOODWORKING CENTER

TECHNICAL FIELD

The invention relates to a woodworking center, and more particularly to such a center having a head to which a large number of portable power hand tools can be attached through the use of a series of adapters and a three-part work table, the tool head and the work table being capable of accurately moving and locating the tooling and the workpiece to accomplish a wide variety of woodworking operations.

BACKGROUND ART

The woodworking center of the present invention is primarily designed to perform a large number of woodworking operations. Because of the built-in accuracy of movements of both the tooling and the workpiece, and because of the wide scope of tooling and accessories which can be used with the center, the center lends itself well to perform numerous operations on plastic and light metal workpieces, as well. However, for purposes of an exemplary showing, the center will be described in its application as a woodworking center.

Prior art workers have devised a number of woodworking tool combinations or centers capable of performing a number of woodworking operations. Such woodworking assemblies, however, generally require specialized tools which are either a permanent part of the woodworking assembly, or are capable of use only with the woodworking assembly.

The woodworking center of the present invention is based on the concept that conventional, readily available, well-known and time proven portable power tools can be mounted on the carriage assembly of the woodworking center and used to perform various woodworking operations for which they were originally designed. The woodworking center accurately aligns, rigidly secures, and moves the tooling with precision not attainable when the tool is hand held. Nevertheless, all of the tooling (with the exception of the wood lathe) can be removed from the machine and used in a conventional manual manner.

The woodworking center of the present invention does not take up any more floor space than some woodworking tools, but is capable of performing an unusually wide variety of woodworking functions with an accuracy, a precision, and a repeatability which simply cannot be achieved manually. Despite its accuracy and repeatability, the woodworking center is simple in construction and very easy to use.

DISCLOSURE OF THE INVENTION

According to the invention there is provided a woodworking center which comprises a horizontal frame which may be bench mounted, or provided with legs, so as to be at a comfortable level for the operator. The horizontal frame mounts a horizontal work table assembly made up of a front work table, a rear work table and a removable intermediate work table. For most woodworking operations, the workpiece is supported by one or more of the work tables of the work table assembly.

The tables of the work table assembly are shiftable horizontally between the front and rear of the horizontal frame. The front work table is moved with precision by an acme screw mechanism. The rear work table is manually movable in the same horizontal front and rear directions. Both the front and rear work tables are lockable in any desired position thereof. When the intermediate work table is used, it is engaged and clamped between the front and rear work tables.

The woodworking center also includes a head comprising a carriage and a tool slide assembly mounted on the carriage. The carriage is located above the work table assembly and is shiftable in a horizontal direction from side-to-side of the horizontal frame. The carriage is capable of being shifted manually, or it can be precisely shifted by an acme screw assembly operable from either end of the woodworking center. The carriage is lockable in any desired position along its path of travel.

The tool slide assembly comprises a vertical tool mounting plate with a horizontal tool mounting plate affixed along its lower edge. The vertical and horizontal tool mounting plates are capable of supporting and properly orienting a wide variety of portable power hand tools. The tool slide assembly is shiftable vertically on the carriage in a precise manner by means of an acme screw assembly and is lockable in any desired position along its path of travel. As will be described at length hereinafter, the carriage and tool slide assembly and the work table assembly are capable of accurately and repeatably moving and locating the tooling and the workpiece to accomplish a wide variety of woodworking operations.

BRIEF DESCRIPTION OF THE DRAWINGS

FIG. 16 is a fragmentary isometric view of the left end portion of the front work table illustrating a longitudinal workpiece guide mounted thereon.

FIG. 16A is a perspective view of a clamp bar of the present invention.

FIG. 17 is a fragmentary isometric view of the left end portion of the front work table illustrating a transverse workpiece guide mounted thereon.

FIG. 18 is an isometric view of a workpiece clamp block.

FIG. 19 is a fragmentary end elevational view illustrating a workpiece clamped between a pair of workpiece clamp blocks.

FIG. 20 if a fragmentary end elevational view, similar to FIG. 19, but illustrating the workpiece held between clamp blocks in a vertical orientation.

DETAILED DESCRIPTION OF THE INVENTION

Figure 1:
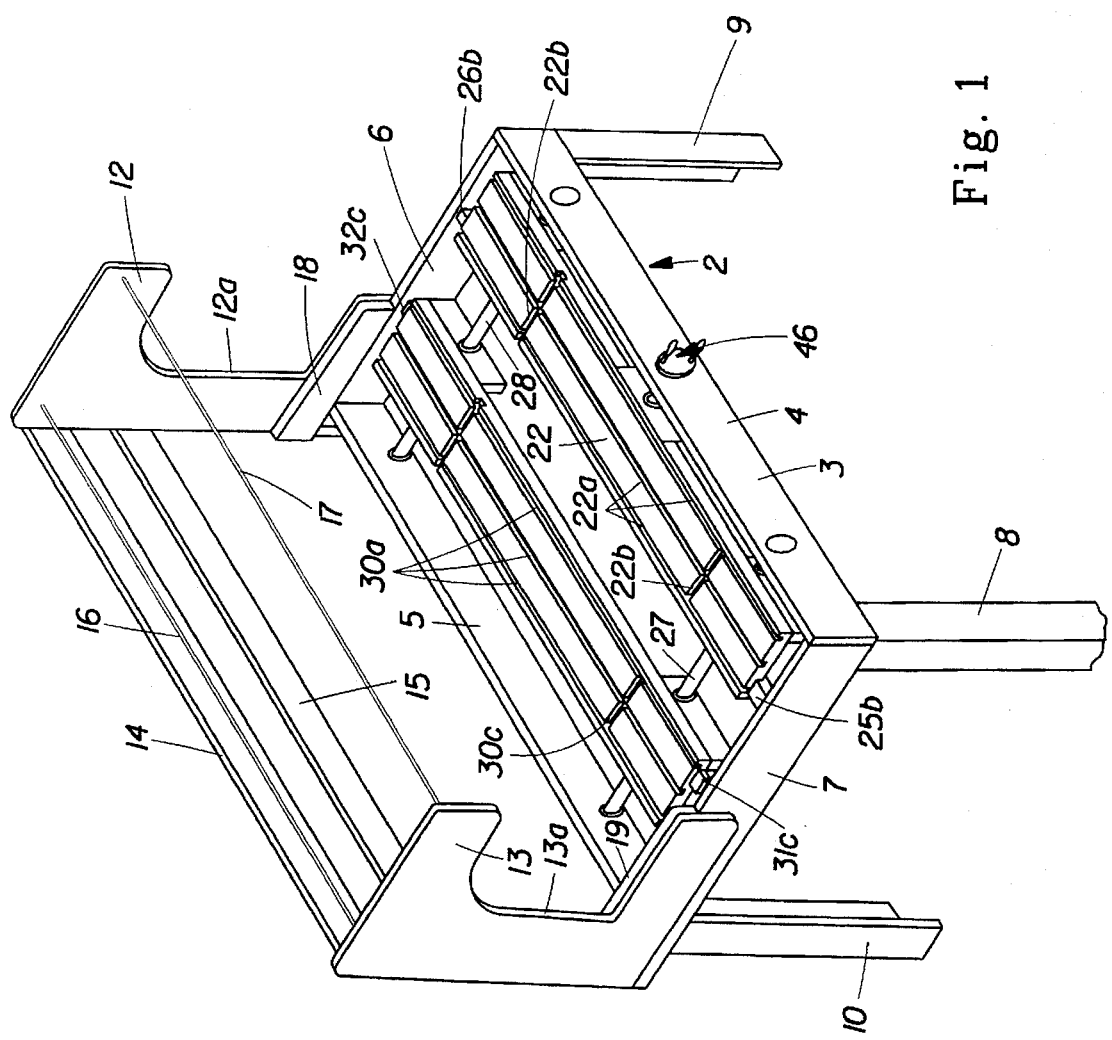
FIG. 1 is an isometric view illustrating the horizontal frame, the front and rear work tables and the support legs for the woodworking center.
Figure 2:
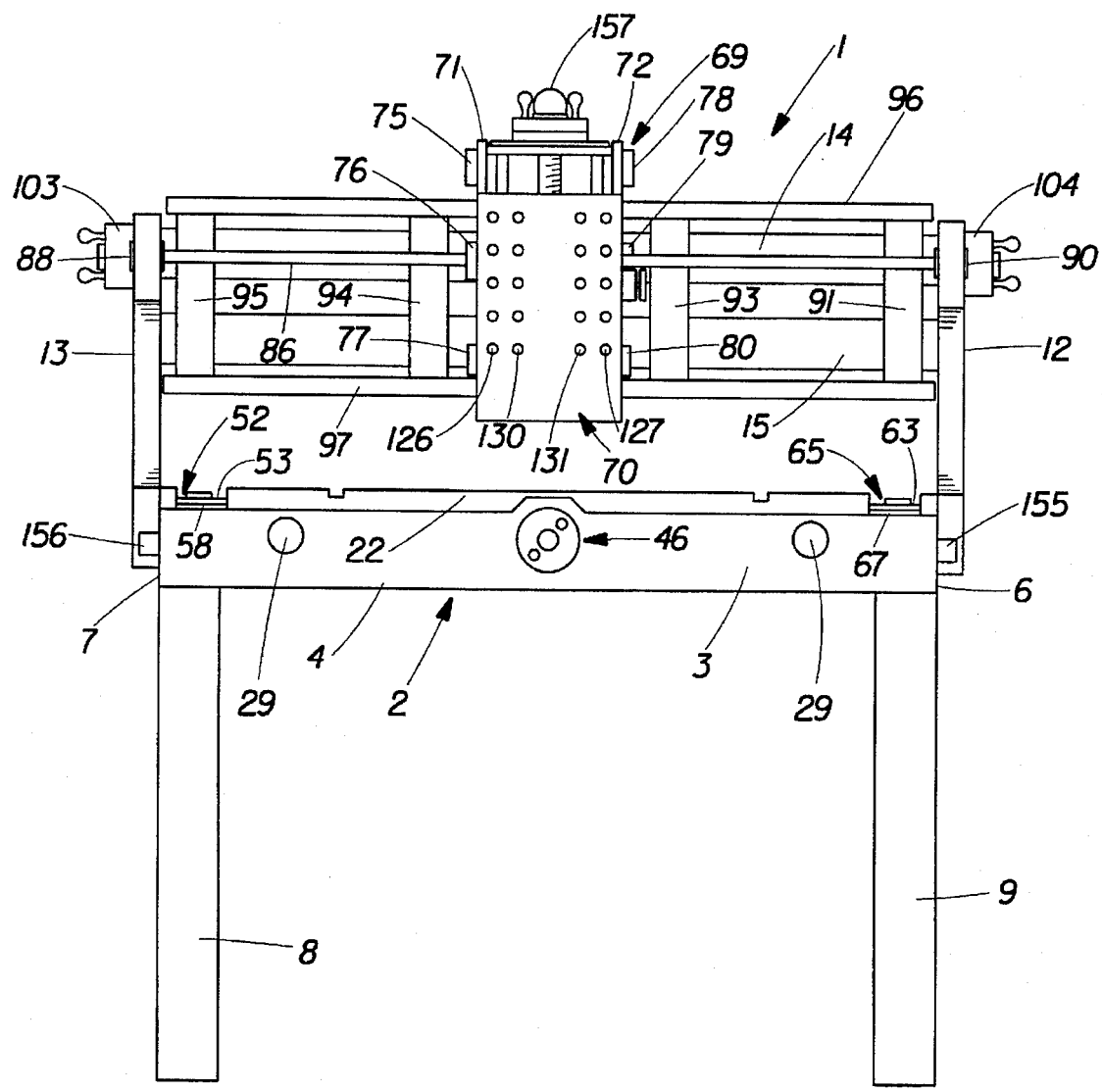
FIG. 2 is a front elevational view of the woodworking center.
Figure 3:
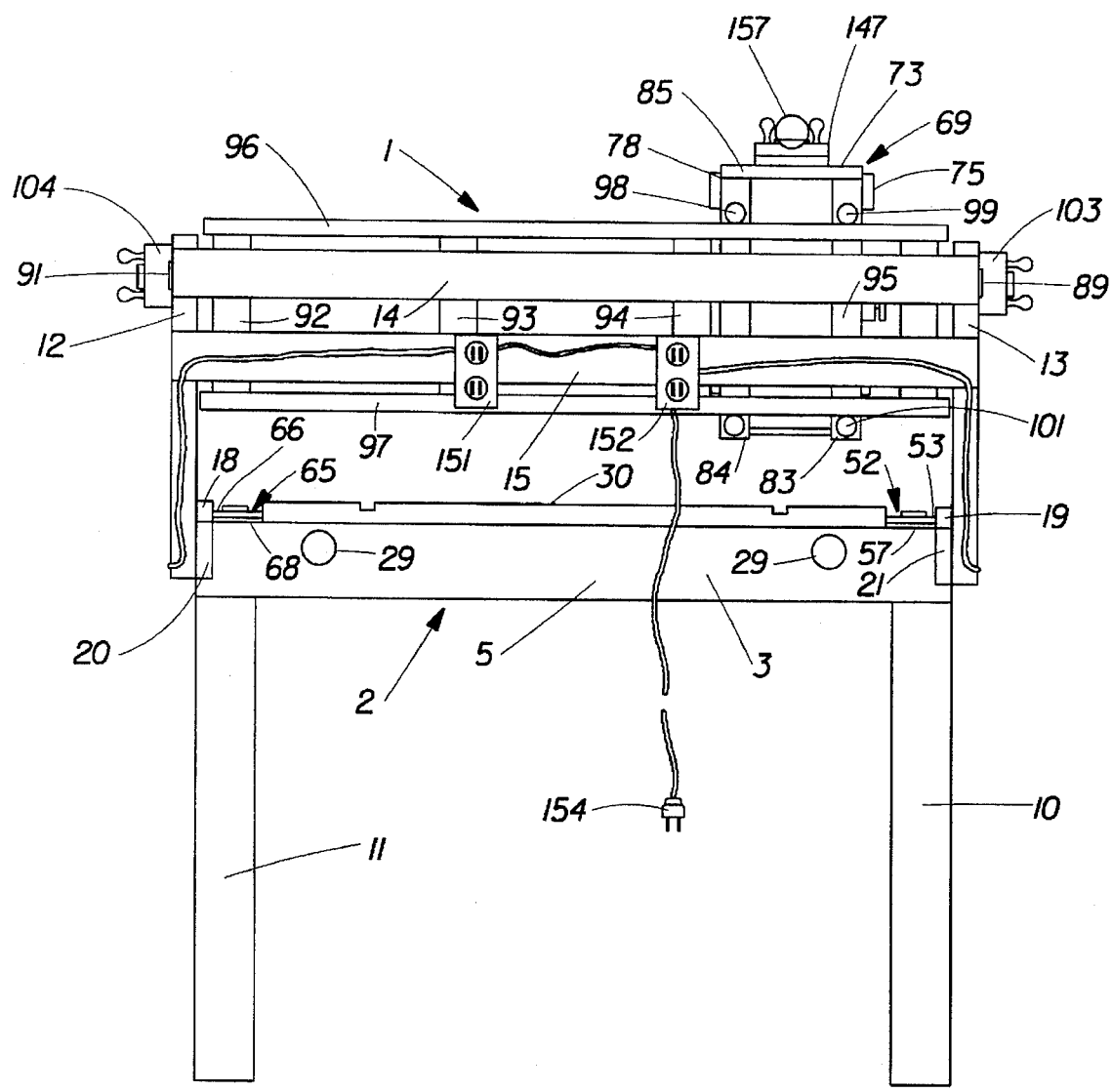
FIG. 3 is a rear elevational view of the woodworking center.

Throughout the drawings, like parts have been given like index numerals. Reference is first made to FIGS. 1, 2 and 3. FIG. 1 illustrates the tool center bench including its front and rear tables. FIGS. 2 and 3 are front and rear elevations, respectively, of the overall woodworking center. The overall woodworking center is generally indicated at 1 in FIGS. 2 and 3 and the bench thereof is generally indicated at 2 in FIG. 1–3.

The bench 2 comprises a horizontal frame 3 made up of front and rear frame members 4 and 5 and side frame members 6 and 7. The frame 3 is supported on front and rear legs 8, 9, 10 and 11. The legs 8–11 are of such length as to bring the frame 3 to a vertical level which would be comfortable for the operator during use of the woodworking center. In an exemplary working embodiment excellent results were achieved when the legs 8–11 were about 28.5 inches long and the front frame member 4, rear frame member 5, and side frame members 6 and 7 had a vertical dimension of about 4.5 inches so that the frame 3 had an overall height of about 33 inches. In some instances, it may be desirable to mount the bench, itself, on a table, workbench or the like. In this case the legs may be eliminated or the bench may be given shorter legs of a length of about 9 inches. The legs 8–11 are of any appropriate construction. In the above-noted exemplary embodiment, each leg was made up of a pair of boards joined together to form an L-shape in cross-section. This is clearly shown in FIG. 1.

The side members 6 and 7 of the horizontal frame 3 mount carriage and tool slide supports 12 and 13. The carriage and tool slide supports 12 and 13 have cutouts 12a and 13a, respectively, for work material clearance. The carriage and tool slide supports 12 and 13 are joined together along their rearmost edges by a pair of horizontal boards 14 and 15. The boards 14 and 15 serve to further strengthen the carriage and tool slide supports 12 and 13. The boards 14 and 15 also act as rail frame supports, as will be further explained hereinafter. The basic bench 2 is further strengthened by a pair of support rods 16 and 17, shown only in FIG. 1. Finally, the carriage and tool slide supports 12 and 13 may be provided with wooden strips 18 and 19 having top and front edges to match the adjacent portions of the carriage and tool slide supports 12 and 13. The strips 18 and 19 are affixed to their respective carriage and tool slide assembly supports 12 and 13 and also to the upper edge of their respective horizontal frame side members 6 and 7. Additional vertical strip pieces 20 and 21 may be affixed respectively to the rear frame member 5 of horizontal frame 3 and to the carriage and tool slide supports 12 and 13, as is shown in the rear view of the woodworking center constituting FIG. 3.

The various parts of the bench 2 thus far described may be made of any appropriate material. In the above-noted working embodiment, they were made of wood. Excellent results were achieved with laminated maple. The parts may be affixed together with any appropriate fastening means (not shown) including wood screws, bolts, adhesive means, and the like, as well as combinations thereof. In the above-noted working embodiment much of the bench was drilled, dowelled and glued together.

The legs 8–11 can be used to support slides for drawers (not shown) accessible from the front of the bench and used to hold the tools and accessories used with the woodworking center 1. Sawdust bins (not shown) may be mounted on the legs at the sides of the bench.

Figure 4:
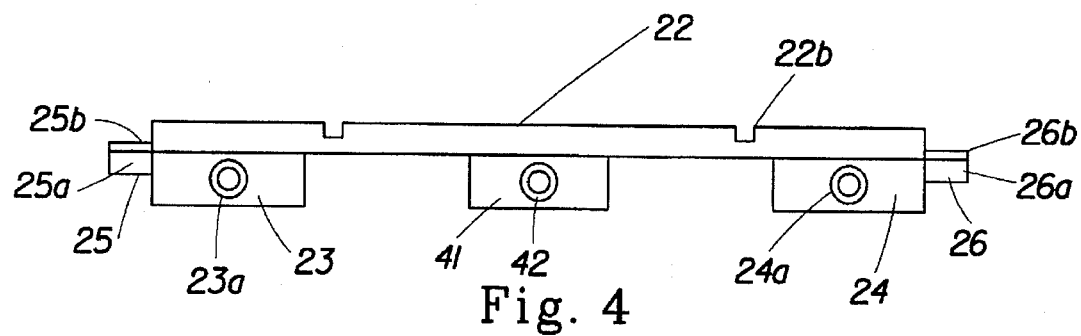
FIG. 4 is a front elevational view of the front work table.
Figure 5:
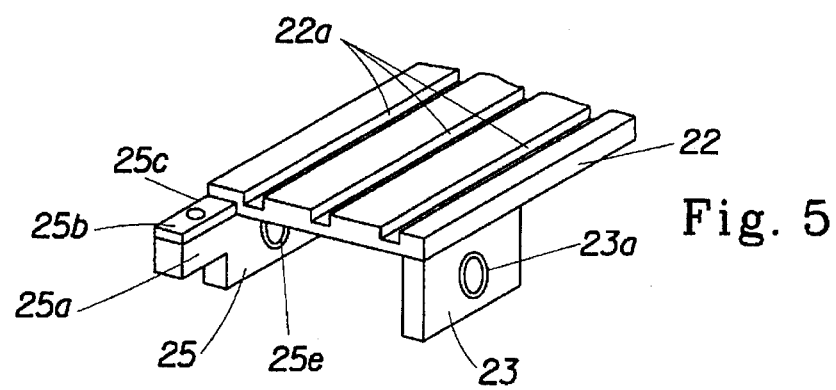
FIG. 5 is a fragmentary isometric view of the left end portion of the front work table.

Reference is now made to FIGS. 1, 4 and 5. A front work table 22 is shown in FIG. 1 mounted within the horizontal frame 3. The length of front work table 22 is slightly less than the distance between the side frame members 6 and 7 of horizontal frame 3 to accommodate table locking arrangements to be described hereinafter. The front work table is provided with three grooves 22a running the full length of the table. These grooves accommodate a standard miter gauge, as well as longitudinal guides that accurately align a workpiece with the longitudinal edges of the table (as will be described hereinafter). Near each end, front work table 22 has a slot 22b of the same width and depth dimensions as the grooves 22a and at right angles thereto. The slots can be fitted with guides to accurately align a workpiece at 90° to the longitudinal edges of work table 22 (again as will be further described hereinafter). The longitudinal grooves 22a may be provided on their bottom surface with ¼ inch threaded holes 22c on 3 inch centers (see FIG. 12). These threaded holes are used to secure the workpiece guides, clamping the workpieces to the work table 22 and to secure certain tooling to the work table 22.

At its forward edge, front work table 22 is provided with downwardly depending rectangular blocks 23 and 24 (see FIGS. 4 and 5). The blocks 23 and 24 are located adjacent the ends of front work table 22 and are provided with appropriate perforations and bushings 23a and 24a. In a similar fashion, along its rearward edge, the front work table 22 is provided with an additional pair of downwardly depending blocks 25 and 26. The blocks 25 and 26 differ from the blocks 23 and 24 only in that they are provided with extensions 25a and 26a which protrude slightly beyond the ends of front work table 22. The extensions 25a and 26a have affixed to their upper surfaces small metallic plates 25b and 26b which constitute lock bar clamp plates, to be described hereinafter. The blocks 25 and 26 are provided with perforations and bushings (one of which is shown at 25e in FIG. 5) which are coaxial with the perforations and bushings 23a and 24a of front blocks 23 and 24.

Referring also to FIG. 1, the perforations 25 and bushings of blocks 23 and 25 and the perforations and bushings of blocks 24 and 26 have work table guide rods 27 and 28 passing therethrough. The work table guide rods 27 and 28 extend through perforations in the front frame member 4 and the rear frame member 5 and are held in place by guide rod keeper plates 29 shown in FIGS. 1–3. The work table guide rods are parallel, and enable the sliding movement of the front work table between the front and rear frame members 4 and 5, maintaining the longitudinal edges of the front work table parallel to the front and rear frame members 4 and 5.

Figure 6:
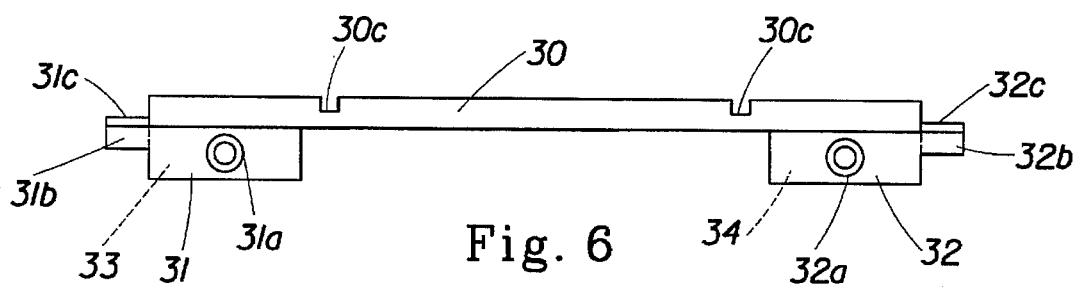
FIG. 6 is a front elevational view of the rear work table.
Figure 7:
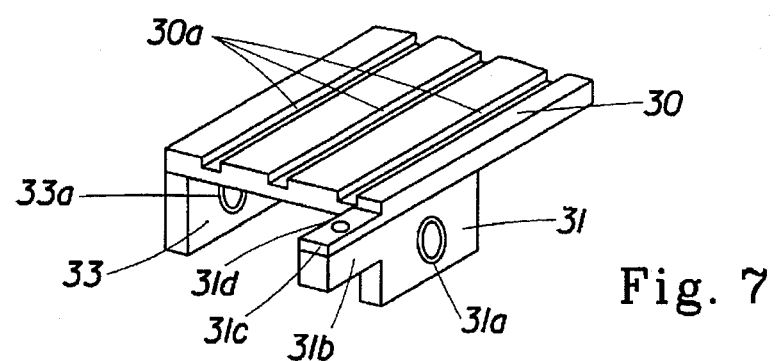
FIG. 7 is a fragmentary isometric view of the left end portion of the rear work table.

Reference is now made to FIGS. 1, 6 and 7. The woodworking center 1 has a rear work table 30 which is essentially identical to front work table 22. Rear work table 30 has three longitudinal grooves 30a identical to the longitudinal grooves 22a of front work table 22 and provided with ¼ inch threaded holes 30b in their bottom surfaces identical to those of longitudinal front work table grooves 22a and serving the same purpose. Similarly, rear work table 30 is provided with transverse grooves 30c adjacent its ends and serving the same purpose as transverse grooves 22b of front work table 22.

The rear work table 30 is provided along its forward edge with a pair of downwardly depending blocks 31 and 32 having perforations with bushings 31a and 32a. The blocks 31 and 32 are substantially identical to the blocks 25 and 26 along the rearward edge of front work table 22. The blocks 31 and 32 have extensions 31b and 32b to which are affixed metallic plates 31c and 32c, also constituting lock bar clamp plates to be described hereinafter.

Along its rearward edge, the rear work table 30 is provided with downwardly depending blocks 33 and 34 which are substantially identical to rectangular blocks 23 and 24 of front work table 22, and both of which are provided with perforations containing bushings, one of which is shown at 33a in FIG. 7. The perforations and bushings of blocks 31 and 33 and the perforations and bushings of blocks 32 and 34 are adapted to receive work table guide rods 27 and 28. As a consequence of this, rear work table 30 may be manually shifted toward and away from rear frame member 5 (see FIG. 1) and the rear edge of rear work table 30 will maintain parallelism with rear frame member 5.

Figure 8:
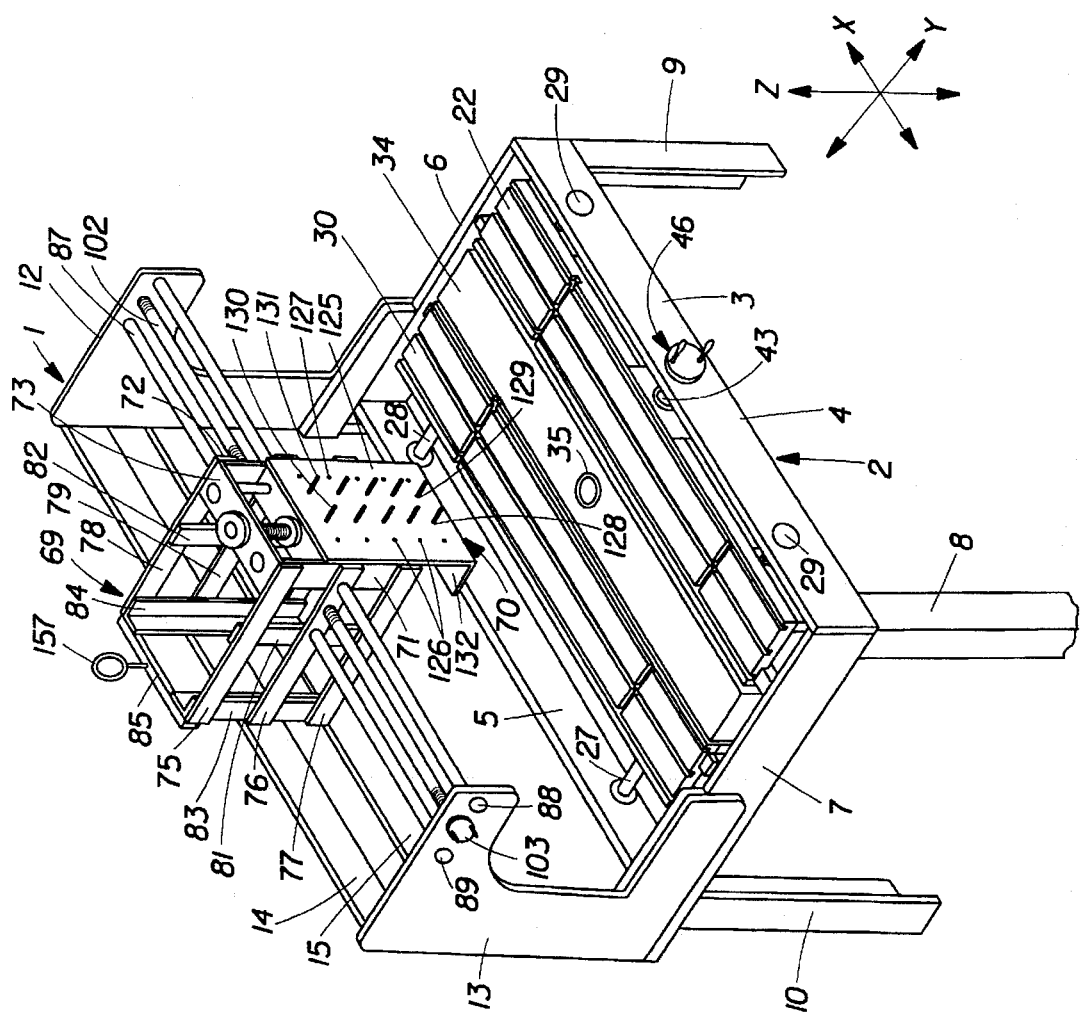
FIG. 8 is an isometric view similar to FIG. 1 and including the intermediate work table and the carriage and tool slide assembly.
Figure 9:
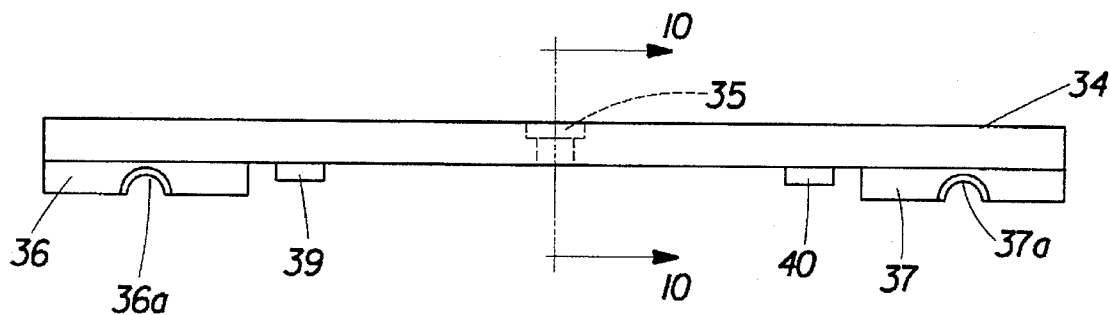
FIG. 9 is a front elevational view of the intermediate work table.
Figure 10:
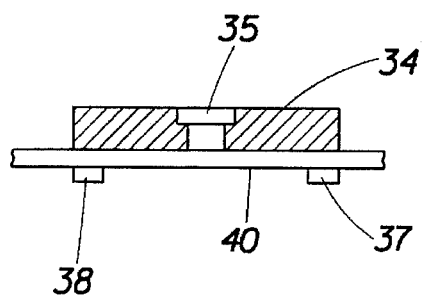
FIG. 10 is a cross sectional view taken along section line 10—10 of FIG. 9.

Reference is now made to FIGS. 8, 9 and 10. The woodworking center 1 may be provided with a third intermediate work table 34. While any appropriate material can be used, in the above-noted working embodiment all three work tables were made of wood. Intermediate work table 34 is of the same length and thickness as front and rear work tables 22 and 30. Intermediate work table 34 has no longitudinal grooves or transverse slots. It is provided at its longitudinal and transverse center with a counterbored perforation 35 adapted to receive size reducing bushings used in contour sawing, vertical edge sanding, contour sanding and drilling operations, as will be further defined hereinafter.

Intermediate table 34, as is shown in FIG. 9, is provided along its forward edge, near its ends, with a pair of downwardly depending blocks 36 and 37. The blocks 36 and 37 are similar to the blocks 23 and 24 of front work table 22, with the exception that their vertical dimension is approximately half that of the blocks 23 and 24. The blocks 36 and 37 are provided with semi-circular notches 36a and 37a adapted to rest upon and partially receive work table guide rods 27 and 28, respectively. The rearward edge of intermediate table 34, near its ends, is provided with an identical set of downwardly depending blocks, one of which is shown at 38 in FIG. 10. The second set of blocks serves the same purpose as blocks 36 and 37. Intermediate work table 34, when used, is located between the front work table 22 and rear work table 30, the upper surfaces of all three tables are coplanar and horizontal.

Intermediate work table 34 is completed by the provision of a pair of hold-down members 39 and 40. The hold-down members may be made of any appropriate material. In the above-noted working embodiment of the woodworking center, members 39 and 40 were made of wood. The members 39 and 40 are affixed to the underside of intermediate work table 34, near the support blocks for the table. The members 39 and 40 extend transversely of the table and are of a length such that their ends extend slightly beyond the forward and rearward longitudinal edges of the intermediate work table 34.

When the intermediate work table 34 is used, it is located between front work table 22 and rear work table 30 with adjacent longitudinal edges of the three work tables in abutment. The intermediate work table 34 cannot move downward by virtue of the fact that it is supported on table guide rods 27 and 28. Intermediate table 34 cannot move in a direction parallel to its longitudinal axis by virtue of the semi-circular notches in its support blocks which engage the table guide rods 27 and 28. Finally, intermediate table cannot move upwardly because the protruding ends of its hold-down members 39 and 40 engage the undersides of front work table 22 and rear work table 30.

Rear work table 30, and intermediate work table 34 (if used) may be shifted along the table guide rods 27 and 28 manually. Front work table 22, on the other hand, is shifted along table guide rods 27 and 28 by an adjustment screw. To this end, front work table 22 is provided with a downwardly depending block 41 located intermediate its ends and along its forward edge (see FIG. 4). The block 41 supports a nut 42 and bracket therefor. The front frame member 4 of horizontal frame 3 is provided with a bore (not shown) coaxial with the nut 42. A front table adjustment screw 43 extends through the bore and is threadedly engaged in front work table nut 42. Both the front table nut 42 and front table adjustment screw 43 are provided with left hand Acme threads, 4 threads per inch. As a result, one revolution of the front work table adjustment screw will result in a ¼ inch movement of the front work table 22 along table guide rods 27 and 28 in a direction determined by the direction of rotation of the adjustment screw 43.

Figure 11:
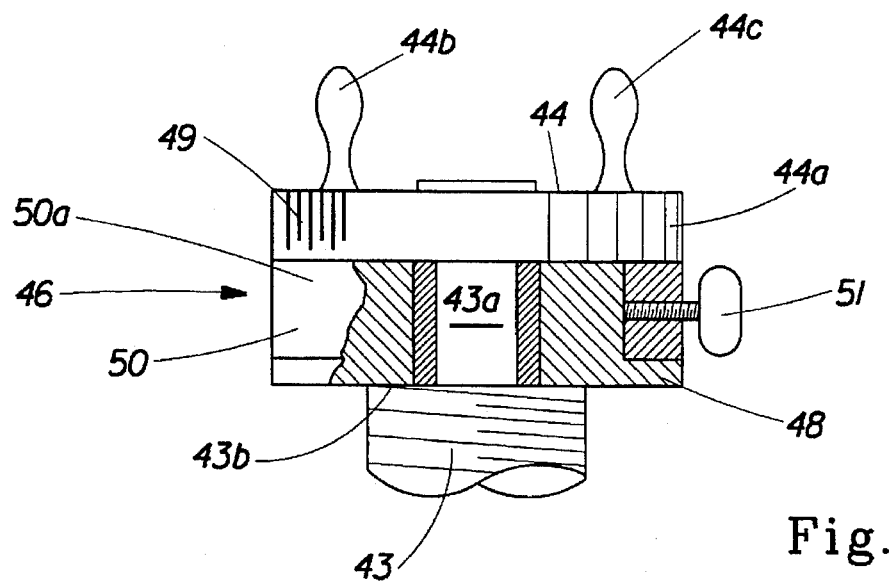
FIG. 11 is an elevational view, partly in cross section, of a graduated dial and zero collar assembly.

The forward end of the front work table adjustment screw 43, which extends through the bore in the front frame member 4 of horizontal frame 3, terminates in a reduced diameter neck 43a forming a shoulder 43b. The neck 43a is non-rotatively affixed to a disk-like graduated dial 44 comprising a part of an overall dial assembly generally indicated at 46. The dial assembly 46 is illustrated, partially in cross-section, in FIG. 11. As is shown in FIG. 11, the front work table adjustment screw 43 is rotatively mounted in a bushing 47. Bushing 47 is mounted in a flanged back-up plate 48 affixed to the front frame member 4 of horizontal frame 3 (see FIGS. 1 and 8). As indicated above, the front work table adjustment screw 43 is non-rotatively affixed to graduated dial 44. The peripheral surface 44a of graduated dial 44 is provided with four graduations applied with a steel number stencil (or in other appropriate ways). These four graduations are "0", "1/16," "1/8," and "3/16." Between each 1/16 graduation there is a 1/32 mark. Between each 1/32 mark there is a 1/64 mark, all generally indicated at 49 in FIG. 11. The graduated dial 44 may be provided with a pair of upstanding, diametrically opposed, identical crank handles 44b and 44c, rotatively mounted on the graduated dial 44. The crank handles 44b and 44c may be used to rotate the graduated dial 44 which, in turn, results in rotation of the front work table adjustment screw 43.

Between the flange of the flanged back-up plate 48 and the graduated dial 44 there is an annular zero collar 50 bearing a zero mark indicated at 50a. The zero collar 50 is rotatable about flanged back-up plate 48. In this way, the zero collar can be rotated thereabout to cause its zero mark to be aligned with any one of the graduations 49 on the graduated dial 44. Once aligned, the zero collar 50 may be locked with respect to the flanged back-up plate by means of thumb screw 51 which engages the flanged back up plate.

Thus, for each rotation of the graduated dial 44 and front work table adjustment screw 43, the front work table 22 will shift 1/4" along the table guide rods 27 and 28, the direction of the table shift being determined by the direction of rotation of graduated dial 44 and front work table adjustment screw 43. As a consequence, front work table 22 may be located along the Y axis of the woodworking center with great precision (see also FIG. 8).

When a precise movement of front work table 22 is to be made, the thumb screw 51 of the zero collar 50 is loosened and the zero collar is rotated until the zero mark on the zero collar is aligned with any of the four 1/16 graduations on the graduated dial 44. The thumb screw is thereafter tightened to hold zero collar 50 in place. Precise movements can be made by turning graduated dial 44 one quarter turn for 1/16" movement, 1/8 turn for 1/32" movement, one 1/16 turn for 1/64" movement, or 1 full turn for 1/4" movement of the front work table 22. Four complete revolutions will move the front work table 1", while 8 revolutions will move it 2", etc.

Precise location of front work table 22 may be used to precisely locate intermediate work table 34 (if used) and rear work table 30. It may also be used to precisely locate a workpiece in proper relation to the tooling in the direction of the Y axis. This is true whether the workpiece is mounted on front work table 22, rear work table 30, or both. As indicated above, the intermediate work table 34 and the rear work table 30 are shiftable along work table guide rods 27 and 28 by hand.

Means are provided to lock the front and rear work tables 22 and 30, once they have been properly located along the table guide rods 27 and 28. It will be understood by one skilled in the art that if intermediate work table 34 is used, it will automatically be locked in place when the front and rear work tables 22 and 30 are locked in place.

Figure 12:
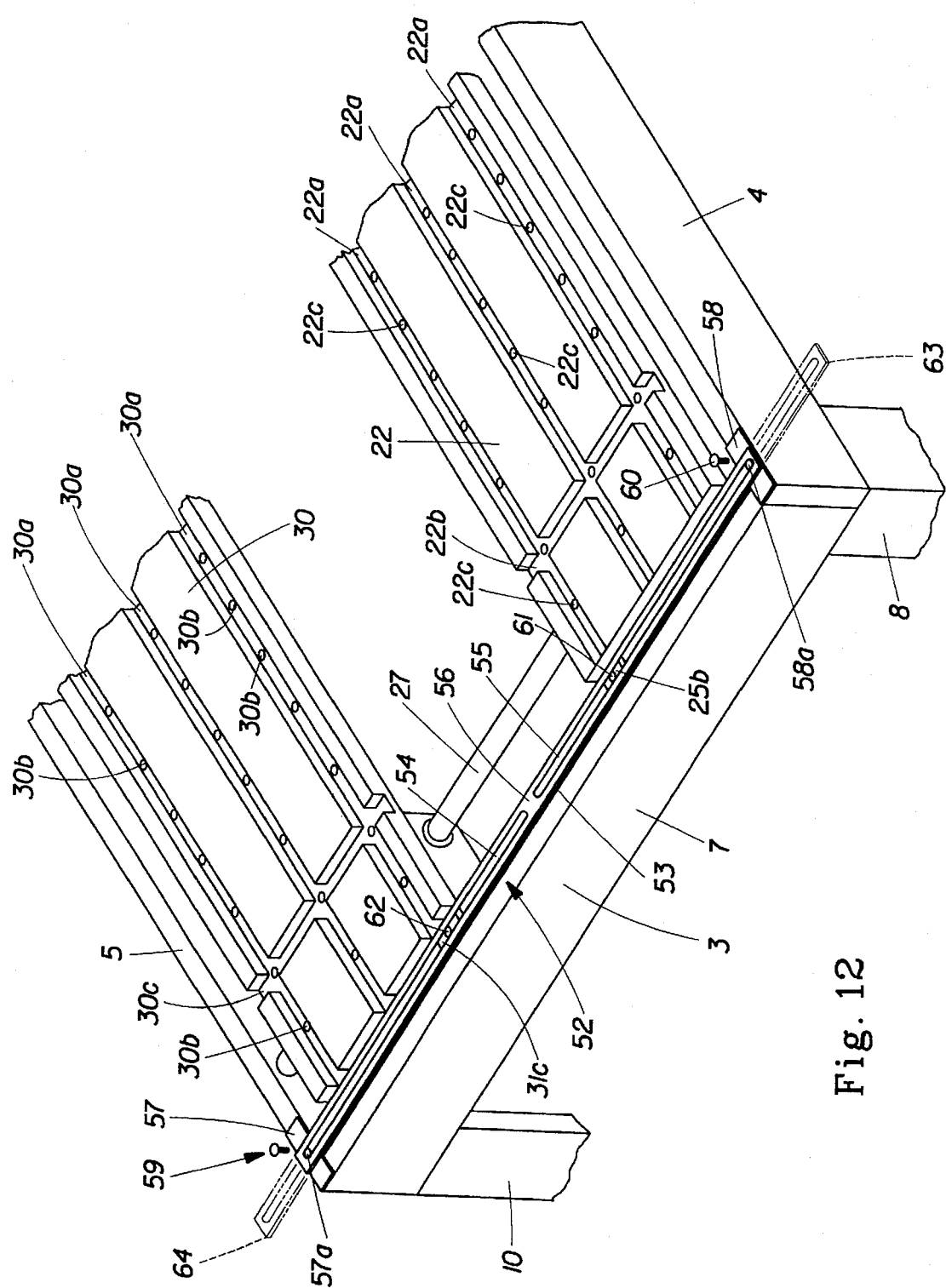
FIG. 12 is a fragmentary isometric view illustrating the horizontal frame, the front and rear work tables, and the locking assembly therefor.

The front and rear work tables 22 and 30 are locked in place at each of their ends. This is accomplished by means of two identical locking assemblies. FIG. 12 illustrates the locking assembly for the left ends of the front and rear work tables 22 and 30. Since the table locking assembly for the right ends of the front and rear work tables 22 and 30 is identical, a description of the left table locking assembly may stand as a description of the right table locking assembly, as well.

The left table locking assembly is generally indicated at 52 in FIG. 12. The left table locking assembly comprises an elongated metallic locking bar 53 having two longitudinal slots 54 and 55, arranged end-to-end along the longitudinal center line of locking bar 53. The longitudinal slots 54 and 55 are separated from each other at the longitudinal center of locking bar 53 as shown at 56.

Locking bar 53 overlies a clamp plate 57 affixed to rear frame member 5. Similarly, locking bar 53 overlies a clamp plate 58 affixed to front frame member 4. Clamp plates 57 and 58 are provided with threaded perforations 57a and 58a, respectively. Locking bar 53 is affixed to clamp plate 57 by a socket head screw 59 passing through slot 53. Similarly, locking bar 53 is affixed to clamp plate 58 by a socket head screw 60 passing through slot 55.

It will be noted that locking bar 52 also overlies clamp plate 25b of front work table 22 and clamp plate 31c of rear work table 30. Clamp plates 25b and 31c are provided with threaded perforations 25c and 31d, respectively. As a consequence, locking bar 53 may also be affixed to clamp plate 25b by socket head screw 61 passing through slot 55. Similarly, clamping bar 53 may be affixed to clamp plate 31c by socket head screw 62 passing through slot 54. When all of the socket head screws 59, 60, 61 and 62 are tightly in place, the left ends of front work table 22 and rear work table 30 are fixed or locked in position. By loosening socket head screws 61 and 62 the tables may be shifted to a different position and locked in that new position. If, for a particular table placement, the space 56 in the locking bar interferes with one or the other of socket head screws 61 and 62, the socket head screw 59 may be removed and the entire locking bar shifted forwardly as shown in broken lines at 63. alternatively, socket head screw 60 may be removed and the entire locking bar 53 shifted rearwardly, as shown in broken lines at 64. Parallelism of front and rear work tables 22 and 30 will be maintained by work table rod guides 27 and 28.

The left and right work table locking assemblies have been eliminated from Figures such as FIGS. 1 and 8, simply for purposes of clarity. The left locking assembly 52 is indicated in FIGS. 2 and 3. The right locking assembly is generally indicated at 65 in FIGS. 2 and 3. As stated above, the right table locking assembly 65 is identical to the left table locking assembly 52, having a locking bar 66. The locking bar 66 cooperates with forward clamp plate 67, rearward clamp plate 68, clamp plate 26b of front work table 22 and clamp plate 32c of rear work table 30.

Reference is now made to FIGS. 2, 3 and 8. The woodworking center 1 of the present invention is provided with a head or carriage assembly, generally indicated at 69. The primary purpose of carriage assembly 69 is to support and shift the tool slide assembly, generally indicated in FIG. 8 at 70.

Figure 13:
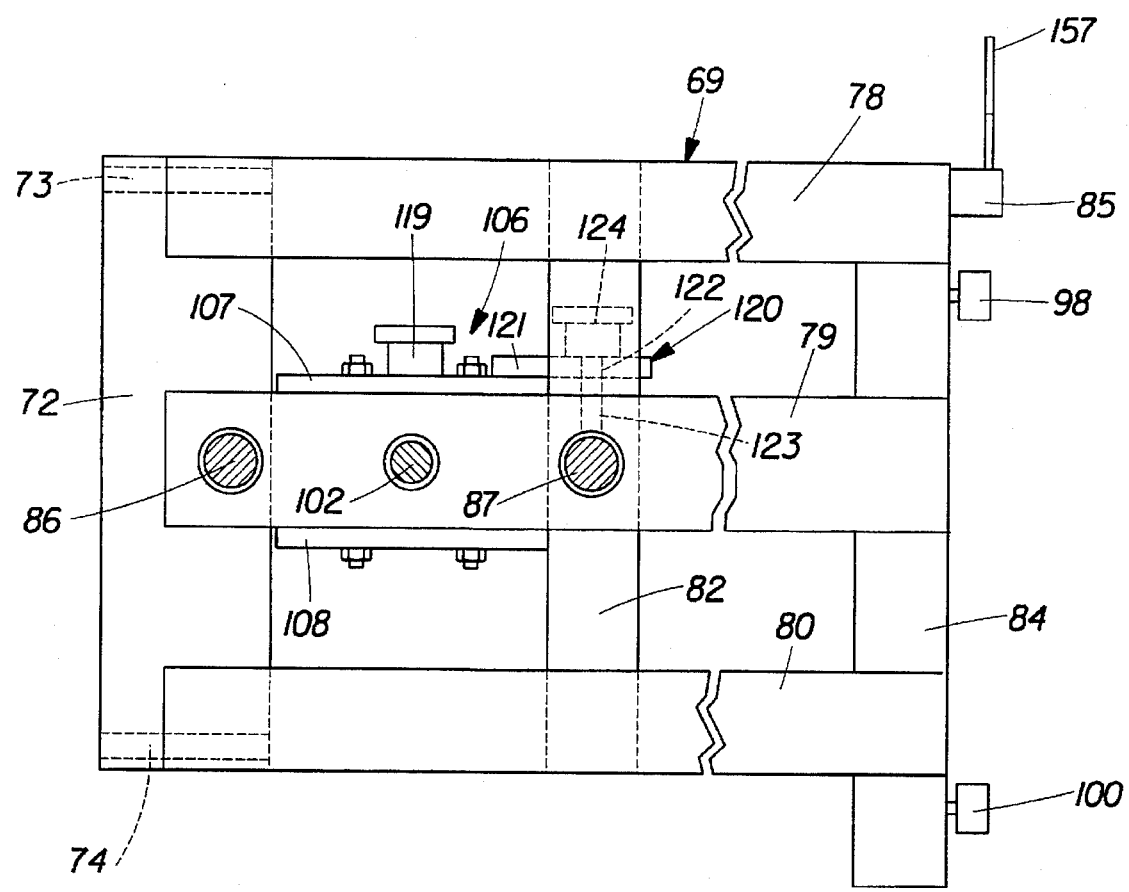
FIG. 13 is a right side elevational view of the carriage.

Reference is now made specifically to FIGS. 8 and 13. The carriage 69 is a substantially rectangular structure, preferably made of metal such as aluminum and having a forward frame portion comprising upright elements 71 and 72 joined together by an upper member 73 and a lower member 74 (see FIG. 13). Extending rearwardly from upright 71 there are three horizontal members 75, 76 and 77. Extending rearwardly from front upright member 72 are three horizontal members 78, 79 and 80, corresponding to horizontal members 75, 76 and 77, respectively. The horizontal members 75, 76 and 77 are interconnected by an intermediate vertical member 81. In similar fashion, the horizontal members 78, 79 and 80 are interconnected by an intermediate member 82.

The horizontal members 75, 76 and 77 are affixed at their rearward ends to a vertical angle iron 83. In similar fashion, horizontal members 78, 79 and 80 are affixed at their rearward ends to a vertical angle iron 84. The overall framework of carriage assembly 69 is completed by a bar 85 of rectangular cross-section joining rear vertical angle irons 83 and 84 at their upper ends. All of the members making up carriage 69 are joined together by suitable fastener means, not shown for purposes of clarity.

The carriage assembly 69 is supported on a pair of carriage guide rods 86 and 87. As is clearly shown in FIGS. 8 and 13, carriage guide rod 86 passes through a bushed hole formed through carriage frame members 72 and 79 (see FIG. 13) and a bushed hole formed through carriage frame members 71 and 76 (see FIG. 8). In similar fashion, carriage guide rod 87 passes through a bushed hole formed in frame members 79 and 82 (see FIG. 13) and a bushed hole formed through frame members 76 and 81 (see FIG. 8). The carriage guide rods 86 and 87 pass through perforations in the carriage and tool slide assembly supports 12 and 13 and are maintained in place by keeper plates 88, 89, 90 and 91 (see also FIGS. 2 and 3).

As is best shown in FIGS. 2 and 3, horizontal boards 14 and 15 have affixed thereto a series of substantially evenly spaced vertical members 92, 93, 94 and 95. The vertical members 92–95 support an upper rail 96 and a lower rail 97. The rear angle irons 83 and 84 of carriage assembly 69 mount upper rollers 98 and 99 which engage the upper surface of rail 96. Angle irons 83 and 84 also mount lower rollers 100 and 101 which ride on the lower surface of rail 97. The rollers 98–101 tend to stabilize the carriage 69 as it shifts along carriage guides rods 86 and 87.

To shift carriage assembly 69 along carriage guide rods 86 and 87, a carriage screw 102 is provided. Carriage screw 102 passes through carriage and tool slide assembly supports 12 and 13 and is provided at either end with dial assemblies 103 and 104 identical to dial assembly 46 of FIG. 11. Dial assemblies 103 and 104 are graduated in an identical manner and are operated as described with respect to dial assembly 46 of FIG. 11. The carriage screw also passes through holes in carriage frame elements 76 and 79.

The carriage screw 102 cooperates with a carriage half nut 105, next to be described. Like the front work table adjustment screw 43 and its nut 42, the carriage screw 102 and half nut 105 are provided with left hand Acme threads, four threads to the inch. Therefore, one rotation on carriage screw 102 will result in a ¼" shift of the carriage assembly therealong, in a direction determined by the direction of rotation of the carriage screw 102.

Figure 14:
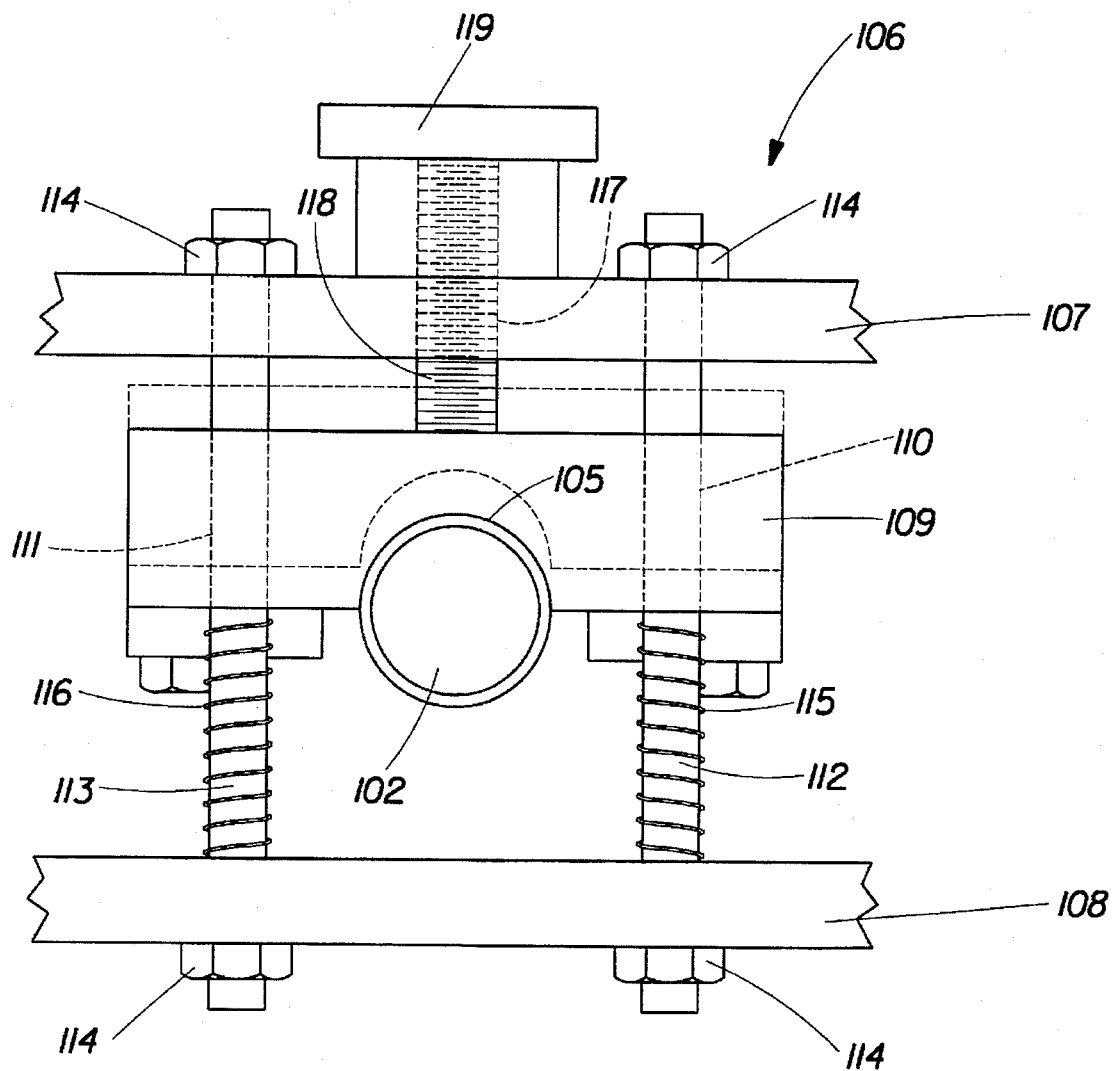
FIG. 14 is a fragmentary elevational view of the carriage half nut assembly.

Reference is now made to FIGS. 13 and 14 wherein the half nut 105 and its assembly generally indicated at 106 are shown. An upper horizontal plate 107 is affixed to the upper edge of carriage frame members 76 and 79 by appropriate fastener means (not shown). In similar fashion, a lower horizontal plate is affixed to the lower edges of carriage frame members 76 and 79 by appropriate fastener means, again not shown.

Turning now specifically to FIG. 14, the horizontal plates 107 and 108 are fragmentarily shown with the carriage screw 102 passing therebetween and the half nut 105 located therebetween. Half nut 105 is mounted in a substantially rectangular holder 109. Relatively near its four corners, the half nut holder 109 is provided with vertical bores, two of which are shown at 110 and 111. Four guide pins pass through the four bores in the half nut holder 109 and also pass through coaxial bores in the plates 107 and 108. Two of the four guide pins are shown at 112 and 113. It will be understood that the other two guide pins are identical and are located near the opposite corners of half nut holder 109. All of the guide pins pass through coaxial bores in plates 107 and 108. The ends of the guide pins are threaded and are maintained in position by nuts, four of which are shown at 114.

All four guide pins are surrounded by compression springs which extend between half nut holder 109 and plate 108 so as to urge the half nut 105 and half nut holder 109 upwardly away from carriage screw 102. The compression springs mounted on guide pins 112 and 113 are shown at 115 and 116, respectively. It will be understood that the compression springs for the two guide pins (not shown) are identical.

Plate 107 has a threaded bore 117 into which a screw 118 is threadedly engaged. The screw 118 is provided with a large, easily manipulated knob 119. When the screw 118 is turned to its extended position, it will cause the half nut 105 to shift downwardly against the action of the compression springs, and to engage the carriage screw so that the carriage assembly 69 will be shifted back and forth along carriage guide rods by rotation of carriage screw 102. The half nut 105 and its holder 109 are shown in the engaged position in full lines. If screw 118 is turned to a retracted position, the half nut 105 and its holder 109 will shift upwardly (by virtue of the compression spring) to a position shown in FIG. 14 in broken lines, wherein the half nut is out of engagement with the carriage screw 102. This enables the carriage assembly to be manually shifted along the carriage guide rods 86 and 87. As will be seen hereinafter, such manual movement of the carriage assembly is required by certain woodworking operations.

When the carriage assembly is positioned for a particular woodworking task, whether by hand or by means of carriage screw 102, it is frequently desirable to lock the carriage in that position. Reference is made to FIG. 13 wherein an exemplary locking mechanism is illustrated. The locking mechanism is generally indicated at 120. The locking mechanism comprises a plate 121 affixed to the central rear portion of plate 107 by appropriate fastening means (not shown) such as machine screws, bolts or the like. The plate 121 overhangs the rearward edge of plate 107 with the overhanging portion overlying carriage guide rod 87. The overhanging portion of plate 121 is provided with a threaded bore 122 in which a vertically oriented screw 123 is threadedly engaged. The screw 123 is provided with an easily manipulable knob 124. When the screw is in its lowermost extended position, it engages the carriage guide rod 87, locking the carriage in position. When screw 123 is turned by knob 124 to a retracted position, the carriage assembly 69 is free to be moved along carriage guide rods 86 and 87. The primary purpose of the carriage assembly 69 is to carry a tool slide assembly to which numerous types of portable power tools may be attached for use with the woodworking center. It will be apparent from the description above, and from FIG. 8, that the carriage will enable a tool to be shifted and precisely positioned along the X axis of the woodworking center.

Figure 15:
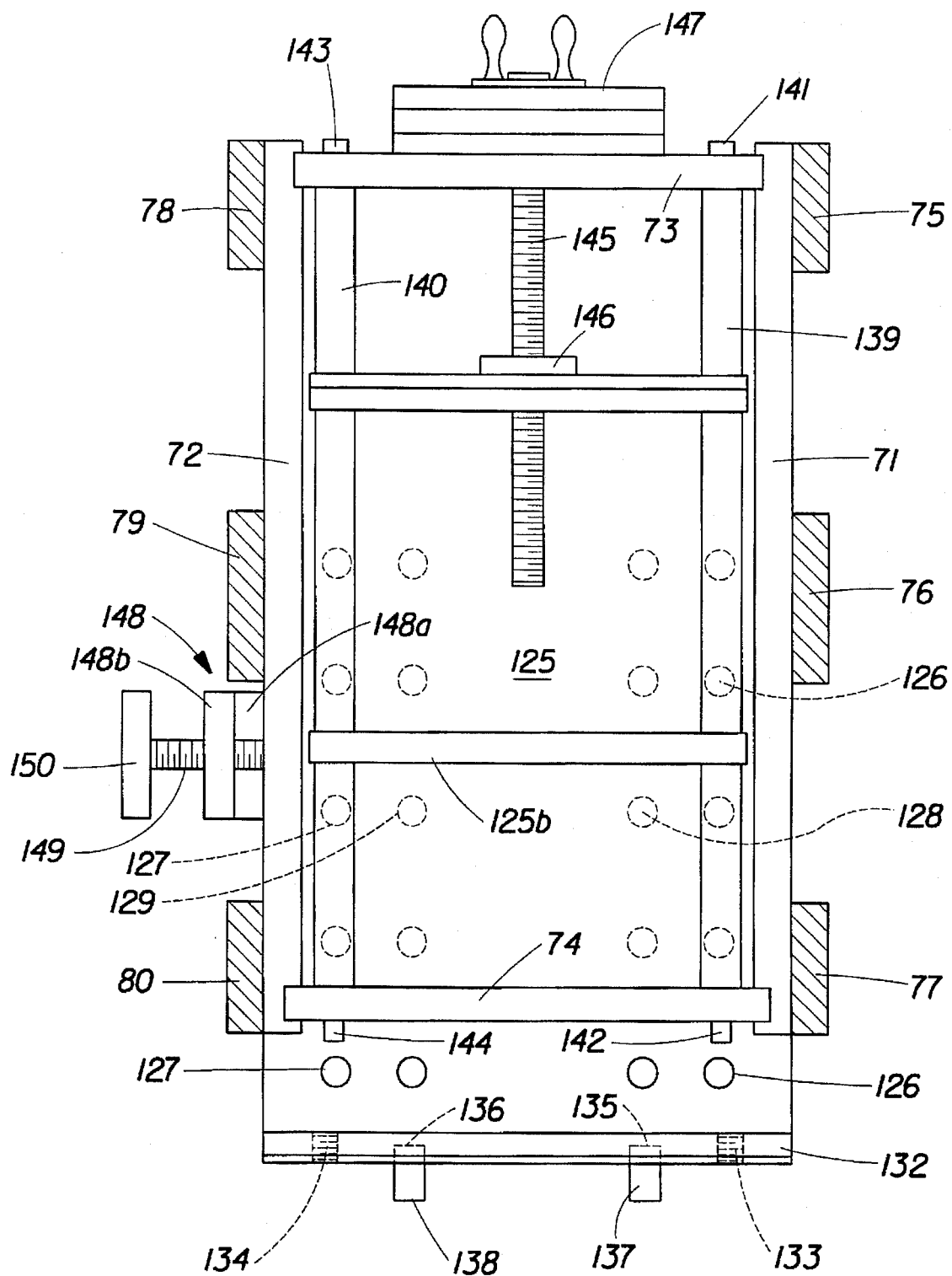
FIG. 15 is a transverse cross sectional view of the carriage illustrating the tool slide assembly mounted thereon.

The tool slide assembly is shown from the front in FIG. 8 and from the rear in FIG. 15. The tool slide assembly comprises a front panel or vertical slide plate 125 of a width sufficient to cover and ride along the forward edges of carriage vertical members 71 and 72. The vertical slide plate 125 has near its vertical edges two rows of corresponding threaded perforations 126 and 127. Inset from the vertical rows of threaded perforations 126 and 127 the vertical plate 125 has two rows of blind bores 128 and 129 which correspond in vertical positioning to each other and to the threaded perforations 126 and 127. The rows of blind bores 128 and 129 receive locating pins 130 and 131, respectively. The threaded perforations 126 and 127 together with the pins 130 and 131 provide means for attaching to vertical slide plate 125 adapter elements for various portable power tools, as will be evident hereinafter. Along its lower edge and extending rearwardly, the vertical slide plate 125 has a horizontal plate 132 affixed thereto. The plate 132 serves as a horizontal tool mounting plate. To this end, the plate 132 has one threaded bore 133 corresponding to the threaded bores 126. The plate also has a second threaded bore 134 equivalent to threaded bores 127. The plate 132 has a pair of blind bores 135 and 136 corresponding to blind bores 128 and 129. The blind bores 135 and 136 mount locating pins 137 and 138, respectively.

It will be noted that at its upper edge, vertical slide plate 125 has an upper rearwardly extending horizontal plate 125a and an intermediate rearwardly extending horizontal plate 125b affixed to vertical plate 125 in any appropriate manner as by machine screws or the like (not shown). Plates 125a and 125b fit between vertical carriage members 71 and 72 with clearance. A pair of tool slide guide rods 139 and 140 pass through perforations in the upper rearwardly extending horizontal plate 125a of slide plate 125 and in the intermediate rearwardly extending horizontal plate 125b of slide plate 125. The ends of the tool slide guide rods 139 and 140 are affixed to the upper horizontal carriage element 73 and the lowermost horizontal carriage element by any appropriate fastening means such as hexsocket set screws 141, 142 and 143, 144, respectively.

The tool slide assembly 70 (including slide plate 125 and horizontal plate 132) may be raised and lowered by means of an adjustment screw 145 threadedly engaged in a nut 146 mounted in tool slide upper horizontal plate 126. As in the case of the front work table adjustment screw 43 and the carriage adjustment screw 102, the adjustment screw 145 and nut 146 of the tool slide assembly 70 are provided with left hand Acme threads, four threads to the inch. The uppermost end of tool slide assembly adjustment screw 145 passes through a perforation in horizontal carriage element 73 and is affixed to a dial assembly 147 identical to dial assembly 46 of FIG. 11. Once again, a full turn of adjustment screw 145 will shift the tool slide assembly ¼" along guide rods 139 and 140, in a direction dependent upon the direction of rotation of the adjustment screw 145.

To lock the tool slide assembly 70 in adjusted position, the vertical plate 125 is provided with an L-shaped bracket 148. The L-shaped bracket has a short leg 148a affixed to the edge of vertical plate 125. The bracket 148 has a long leg 148b which is parallel to and spaced from carriage vertical member 72. The bracket leg 148b has a threaded perforation therethrough in which an adjustment screw 149 is threadedly engaged. The adjustment screw 149 is provided with an enlarged knob-like head 150 by which the screw may be readily manually manipulated. When the screw is turned to an extended position, it will abut the vertical carriage frame member 72, locking the tool slide assembly 70 in adjusted position. When the screw 149 is turned to a retracted position, it will be out of engagement with vertical carriage member 72 and the tool slide assembly 70 will be free to be shifted by adjustment screw 145.

It will be apparent from the above description and FIG. 8 that the tool slide assembly 70 will enable a tool to be shifted and precisely positioned along the Z axis of the woodworking center.

As will be developed shortly hereinafter, the tool slide assembly is adapted to mount a plurality of different types of electric portable power tools. The portable power tools, readily available from a number of manufacturers, are intended to be connected to a source of electricity.

To this end, the lower transverse board 15 extending between carriage and tool slide supports 12 and 13 has mounted thereon a pair of conventional outlets 151 and 152. The outlets 151 and 152 are so wired that they receive current from an ordinary wall outlet or the like via electrical wire 153 and plug 154. The circuit is such that outlet 151 can only be energized by means of safety switch 155 mounted on frame member 6 of horizontal frame 3 (see FIG. 2). Similarly, outlet 152 will be energized only when safety switch 156 is in its "on" position. Safety switch 156 is affixed to the side frame member 7 of the horizontal frame 3. Any appropriate tool, mounted on tool slide assembly 70 can be plugged into either outlet box 151 or outlet box 152. The rear horizontal bar 85 of carriage 69 is provided with an upstanding ring 157 through which the cord of an appropriate tool mounted on tool slide assembly 70 may pass on its way to either one of outlet boxes 151 or 152. This assures that the cord of the tool does not get tangled in the appurtenances of the woodworking center and does not get in the way of a woodworking operation.

It will be understood by one skilled in the art that the woodworking center 1 of the present invention may be provided with a number of accessories for use during various ones of the woodworking operations. For example, the woodworking center may be provided with one or more lights (not shown) to illuminate the workpiece and the operation being performed thereon.

The woodworking center will be provided with two longitudinal workpiece guides 158. The workpiece guides 158 are preferably made of metal and comprise elongated bars having a length equal to the length of the front or rear work tables. In the above-noted working embodiment of the present invention, the longitudinal grooves 22a of front work table 22 and 30a of rear work table 30 extended the length of their respective tables and had a width of ¾", a height of 7/16" and a length of 36". Correspondingly, the longitudinal workpiece guides 158 were provided with a width of ¾" to be received within the slots, a height of ⅝" so that they would extend above the surface of the front or rear work table and a length of 35¼". The longitudinal workpiece guides 158 can be used in any of the three grooves 22a of front work table 22 and in any of the grooves 30a of rear work table 30. They may be used to clamp a workpiece between them, or to guide a workpiece if it is being shoved longitudinally past a tool such as a circular saw or the like, or simply to align a workpiece.

It will be remembered that the front work table 22 is provided with a pair of transverse grooves 22b, and the rear work table is similarly provided with a pair of transverse grooves 30c. In the working embodiment, these grooves were of a ¾" width, a 7/16" depth and extended the width of their respective front or rear table, in this instance having an 8" length. Metallic transverse workpiece guides 160 may be provided having a width of ¾", a height of ⅝", and a length of 8". Two such transverse guides 160 were provided, and can be used in any of the transverse grooves 22b and 30c of the front work table 22 and rear work table 30. They may be used both as workpiece guides and as workpiece alignment means.

FIG. 16 illustrates one of the longitudinal workpiece guides 158 mounted in the innermost one of the longitudinal grooves 22a of front work table 22. Each of the longitudinal workpiece guides 158 is provided with a plurality of drilled and countersunk holes 159 equal in number and coaxial with the holes 22c of the front work table longitudinal grooves 22a and the holes 30b of the longitudinal rear work table grooves 30a. In FIG. 17, one of the transverse workpiece guides 160 is shown in the left hand one of the front work table transverse grooves 22b. The transverse workpiece guides are provided with drilled and countersunk holes 161 equal to and coaxial with the holes 22c of the front work table and the holes 30b of the rear work table. In the working embodiment, the longitudinal workpiece guides 158 and the transverse workpiece guides 160 are secured in place by using ¼"×1½" flathead, hexsocket, cap screws.

A workpiece, depending upon its size and shape, may be clamped to the front work table 22 or the rear work table 30 by overlying clamp bars 158 (see FIG. 16A). In the working embodiment, four such clamp bars were provided having dimensions of ⅜"×2"×4" and being made of aluminum. The clamp bar may be fastened to the front work table 22 or the rear work table 30 by ¼" hexhead cap screws of appropriate length to accommodate the workpiece thickness. Each clamp bar is provided with a central clearance perforation for is respective hexhead cap screw, which may be threadedly engaged in any of the threaded groove or slot perforations 22a and 30b.

The woodworking center may also be provided with two pairs of cooperating workpiece clamp blocks. All four blocks are identical and have an overall height of 1½", an overall width of 2", and a length of 6". One such workpiece clamp block is illustrated at 162a in FIG. 18. Clamp block 162a has two pairs of work table contacting surfaces 163–164 and 165–166. The cooperating pair of surfaces 163–164 are separated by a central longitudinal flange 167 so sized as to be received with a close fit in any one of the front work table longitudinal grooves 22a and the rear work table longitudinal grooves 30a. Table contacting cooperating surfaces 165 and 166 are similarly separated by a longitudinally extending flange 168 adapted to be received with a close fit within any one of the front work table longitudinal grooves 22a and the rear work table longitudinal grooves 30a. At each of the four corners of clamp block 162a there is a different sized off-set 169, 170, 171 and 172 sized to accommodate the clamping of workpieces having a thickness of ¼", ½", ¾", and 1", respectively. Finally, the block 162a is provided with a central vertical perforation 173 whereby the block may be secured in a longitudinal groove of front work table 22 or rear work table 30 by means of a ¼"×3" socket head cap screw threadedly engaged in one of the threaded perforations of the longitudinal groove in which the block is located.

FIG. 19 illustrates the clamp block 162a mounted in a groove 22a of front work table 22 and an identical clamp block mounted in a groove 30a of rear work table 30. The blocks 162a and 162b are so arranged as to have their off-sets 172 facing each other so that a 1" thick workpiece 174 can be supported and clamped therebetween. It will be understood that a second pair of clamp blocks (not shown) will be located near the other end of workpiece 174.

FIG. 20 illustrates workpiece 174 held by the clamp blocks in such a manner that its edge extends upwardly for treatment such as sanding, beveling, or the like. Again it will be understood that a second pair of clamp blocks, identical to blocks 162a and 162b will similarly hold the other end of workpiece 174.

Figure 21:
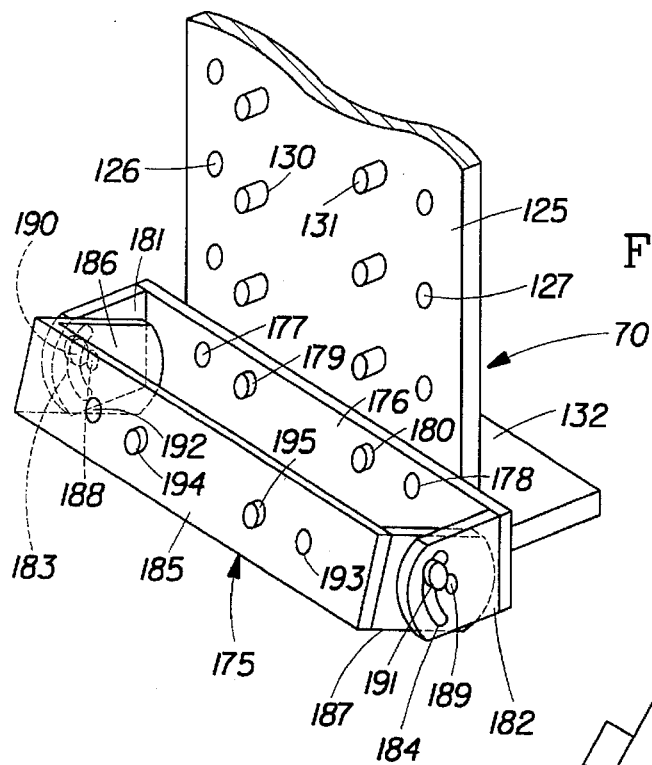
FIG. 21 is a fragmentary isometric view of the tilting tool mount affixed to the vertical slide plate of the tool slide assembly.
Figure 22:
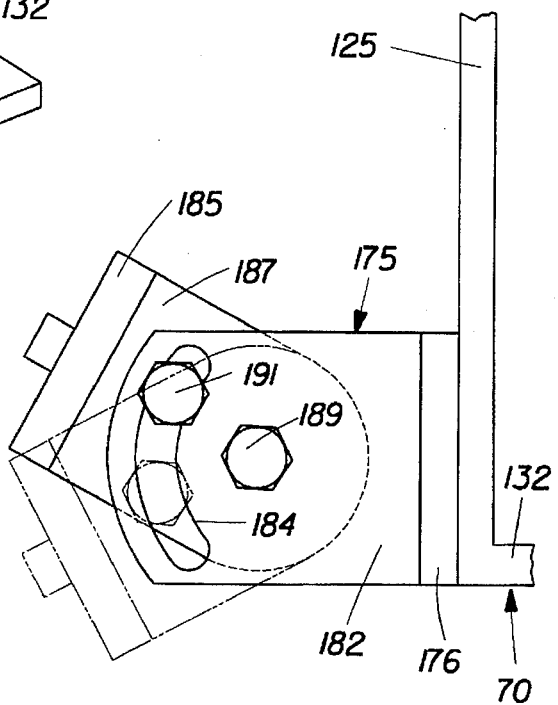
FIG. 22 is a fragmentary end elevational view of the structure of FIG. 21 as seen from the, right of FIG. 21.

FIGS. 21 and 22 illustrate a tilting tool mount generally indicated at 175. The tilting tool mount 175 has a first base 176 of a length slightly longer than the width of the vertical slide plate 125. The first base 176 is provided with perforations 177 and 178 equal to and locatable coaxially with a corresponding pair of vertical slide plate perforations 126 and 127. The first base 176 also has a pair of locating pin holes 179 and 180 aligned with the locating pins 130 and 131 of vertical slide plate 125. The first base 176 of tilting tool mount 175 is removably affixable to the vertical slide plate 125 by means of bolts (not shown) passing through the perforations 177 and 178 into one of the corresponding pairs of perforations 126 and 127 of the vertical slide plate 125.

The first base member 176 of tilting tool mount 175 is provided with forwardly extending arms 181 and 182. The arms 181 and 182 have rounded ends and are provided with arcuate slots 183 and 184, the purpose of which will be apparent hereinafter.

A second base member 185 is of a length slightly less than first base member 176 and is provided with rearwardly extending arms 186 and 187. The arms 186 and 187 have rounded rearward ends and just nicely fit between the arms 181 and 182, and are pivoted thereto as at 188 and 189. The arms 186 and 187 of second base member 185 are provided with threaded bores, the threaded bore of arm 186 being indicated by a broken line at 190. The threaded bore of arm 187 is identically placed. These threaded bores are each adapted to receive a bolt, each bolt passing through one of the arcuate slots 183 and 184 in arms 181 and 182. One such bolt is indicated at 191 in FIGS. 21 and 22. These last mentioned bolts may be tightened so that the second base plate 185 can be locked in any angular relationship as limited by the arcuate slots 183 and 184. At the upper limit of the slots 183 and 184, the second base 185 lies at an angle of 45 degrees to the horizontal and slopes toward the front of the woodworking center. At the lowermost limit of the slots 183 and 184, the second base member 185 lies at an angle of 45 degrees to the horizontal and slopes toward the rear of the woodworking center. The second base member 185 is provided with a pair of threaded perforations 192 and 193 equivalent to the threaded perforations 126 and 127 of the vertical slide plate 125. Similarly, the second base plate 185 is provided with a pair of locating pins 194 and 195 equivalent to the locating pins 130 and 131 of vertical slide plate 125. As a result, the adaptor of any appropriate portable power hand tool can be affixed to the second base member 185 in the same manner in which it could be directly affixed to the vertical slide plate 125.

Figure 23:
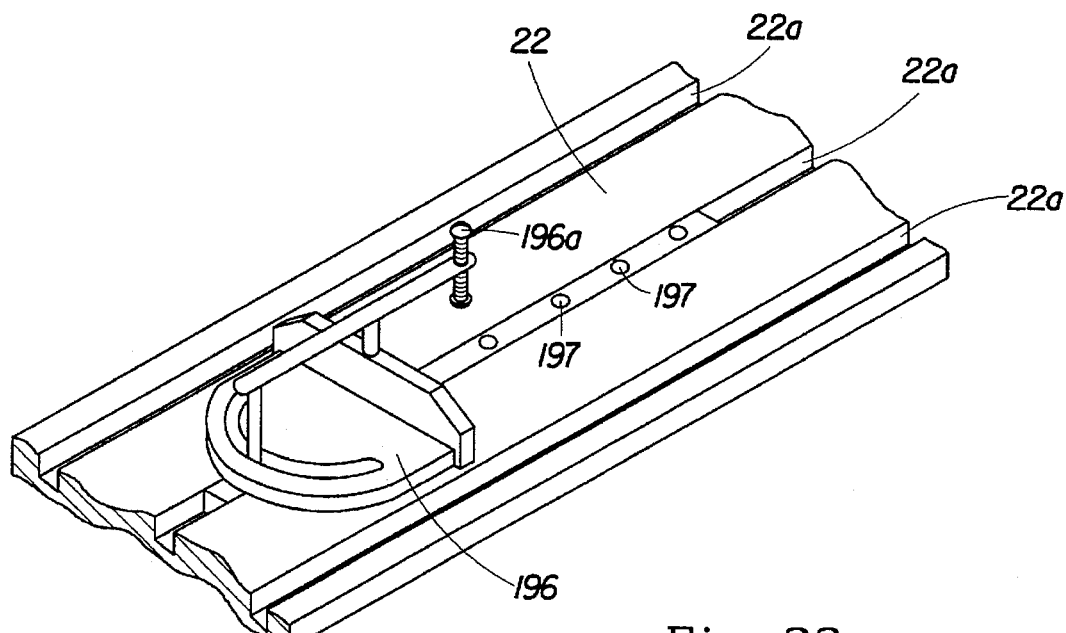
FIG. 23 is a fragmentary isometric view illustrating a miter gauge mounted on the front work table.

The woodworking center 1 may be provided with a conventional miter gauge for use on the front work table 22 or the rear work table 30. The miter gauge may be used in the normal manner by pushing it along any one of the longitudinal table grooves 22a of front work table 22 or 30a of rear work table 30. In FIG. 23, a conventional miter gauge is shown at 196 and is located in the center longitudinal groove 22a of front work table 22. The miter gauge 196 is provided with a countersunk bore 197 by which it may be secured to front work table 22 using a ¼"×1½" flat head, hexsocket cap screw threadedly engaging one of the threaded perforations 22d of the longitudinal grooves 22a. In such an instance it can be used as an abutment for, a guide for, or even a clamp for an appropriate workpiece, using hold-down screw 196a. It will be understood that the miter gauge 196 could be similarly affixed to the rear work table 30.

Meter gauge 196 may be provided with additional counter sunk bores 197 on three inch centers so that hold-down screw 196a can be used to clamp one edge of a workpiece and a clamp bar 158a (see FIG. 16a) can be used to hold down the opposite edge of the workpiece. The clamp bar cap screw will pass through the central perforation of the clamp bar, one of the miter gauge bores and will threadedly engage one of the work table groove or slot perforations 22a and 30b.

Figure 24:
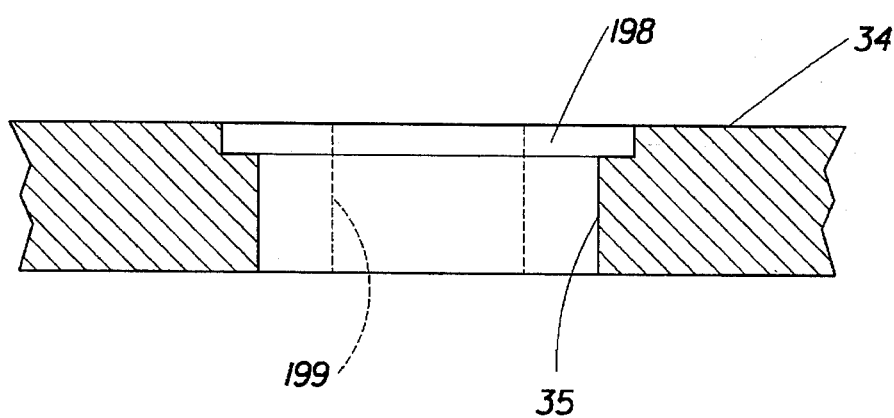
FIG. 24 is a fragmentary longitudinal cross sectional view of the intermediate table illustrating a reducing bushing mounted in the central countersunk bore thereof.

Referring to FIG. 8, it will be remembered that the intermediate table 34 is provided with a counterbored perforation 35 at its longitudinal and transverse center. The perforation 35 is adapted to receive size reducing bushings used in contour sawing, vertical edge sanding, and drilling operations. FIG. 24 is a fragmentary longitudinal cross sectional view taken through the perforation 35 of intermediate table 34 and illustrating an exemplary flanged bushing 198 therein. The flanged bushing 198 is provided with a central bore 199. In the working embodiment of the woodworking center of the present invention six such flanged bushings were provided. All six flanged bushings had the same outside diameters so as to nicely fit within the counterbored perforation 35. The bushings had central bores of ¾", 1", 1¼", 1¾", 2¼" and 3¼" diameters. The flanged bushings such as bushing 198 are held in the counterbored perforation 35 by two allen set screws (not shown). The set screws extend inwardly from both longitudinal edges of intermediate table 34.

Together with the six flanged bushings, the working embodiment of the woodworking center of the present invention was provided with six sanding drums to be powered by a hand drill vertically mounted on vertical slide plate 125. The sanding drums were provided in the following sizes: ½" outside diameter and 2" length; ¾" outside diameter and 2" length; 1" outside diameter and 2" length; 1 ½" outside diameter and 2" length; 2" outside diameter and 2" length; and 3" outside diameter and 2" length.

Figure 25:
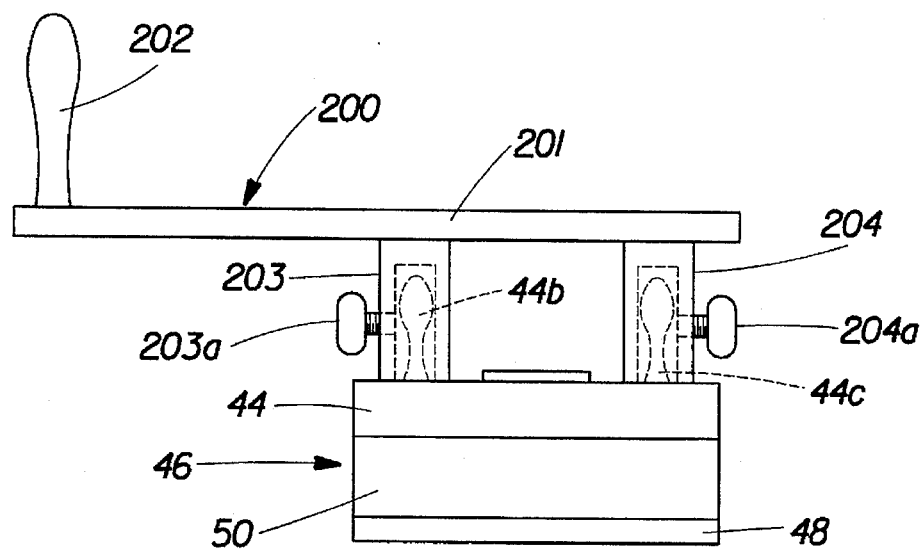
FIG. 25 is an elevational view of a crank for use with any of the graduated dial assemblies of the woodworking center.

The woodworking center 1 may be provided with an auxiliary crank which can be used to actuate any one of the four graduated dials of the woodworking center. For purposes of an exemplary showing, reference is made to FIG. 25 wherein the crank is generally indicated at 200 and is shown positioned on the dial assembly 46 of FIG. 11. Again, like parts have been given like index numerals. In FIG. 25, the graduated dial 44, the ranged back-up plate 48 and the zero collar 50 of the overall dial assembly 46 are shown. It will be remembered that the graduated dial 44 is provided with a pair of upstanding, diametrically opposed, identical crank handles 44b and 44c, rotatively mounted on the graduated dial 44.

The crank 200 comprises an elongated body 201. At one end of body 201 there is a crank handle 202. While the crank handle may be rigidly affixed to body 201, it is preferable that the handle is rotatively mounted thereon. On that side of body 201, opposite the side from which handle 202 extends, there is provided a pair of tubular members 203 and 204 so sized and positioned as to receive crank handles 44b and 44c with a sliding fit. Tubular members 203 and 204 may be provided with thumb screws 203a and 204a which may be tightened against crank handles 44b and 44c to maintain the auxiliary crank handle 200 in place. Crank 200 can be easily mounted on and removed from any one of the four graduated dial assemblies of the woodworking center. When a particular woodworking operation requires that one of the graduated dial assemblies be turned repeatedly, the auxiliary crank 200 will make the repeated turning of the graduated dial both easier and faster.

Other accessories can be provided for the woodworking center. One such accessory is a sawdust vacuum system. Such vacuum systems are readily available.

It would also be within the scope of the invention to provide the woodworking center with a set of four graduated dials provided with metric graduations.

As has been indicated above, the woodworking center 1 of the present invention is capable of having a wide variety of portable power hand tools mounted on the tool slide assembly 70. Examples of such tools include a circular saw, a saber saw, a drill, a planer, an orbital disk sander, a router and a wood lathe.

Figure 26:
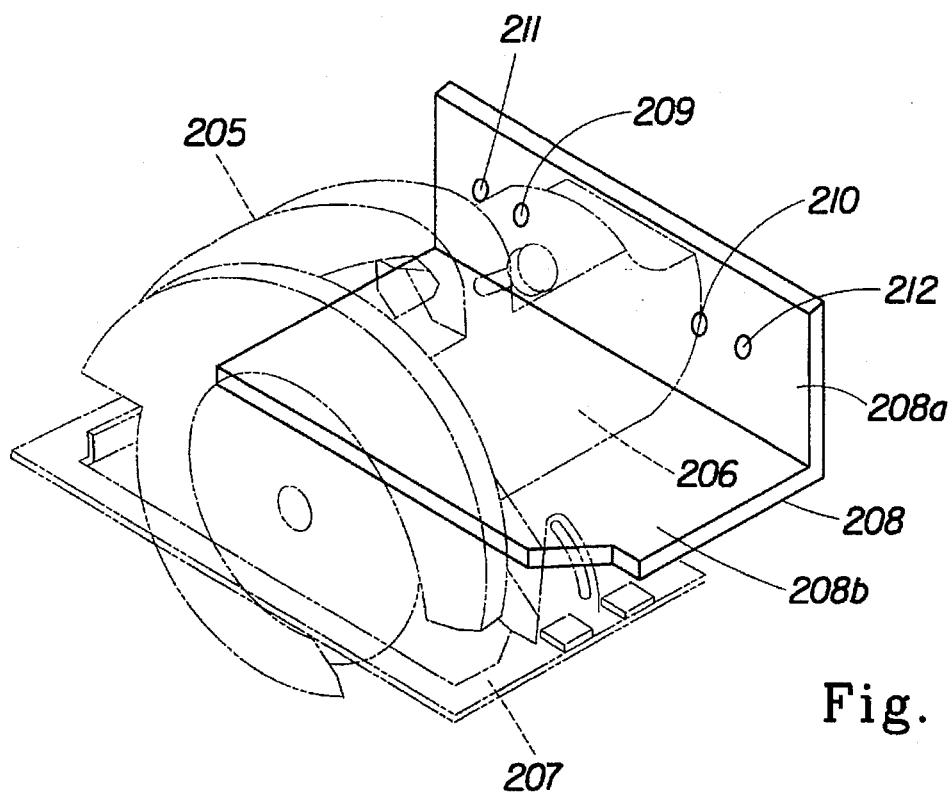
FIG. 26 is an isometric view illustrating a circular saw and an adapter therefor by which it may be affixed to the vertical slide plate of the tool slide assembly.

It will be understood that each of these tools will be provided with an adaptor by which it may be attached to the tool slide assembly 70. It will be further understood by one skilled in the art that the specific nature of the adaptor will depend upon the particular tool being used. For example, any of the above listed tools are made by a number of different manufacturers, and each manufacturer may have several models of the tool. Thus, the adaptor will have to be tailored to the individual tool. Reference is made to FIG. 26 wherein an exemplary circular saw is indicated at 205. The motor and blade assembly 206 of circular saw 205 are mounted on a tool base 207. In many models, the base 207 and the blade and motor assembly 206 are tiltable with respect to each other. This enables angled cuts.

The adaptor 208 is of L-shaped configuration having a vertical leg 208a and a horizontal leg 208b. The vertical leg 208a is provided with a pair of perforations 209 and 210 adapted to receive a corresponding pair of locator pins 130 and 131 on the vertical slide plate 125. The vertical leg 208 has additional perforations 211 and 212 adapted to be coaxial with a corresponding pair of threaded perforations 126 and 127 of the vertical slide plate 125 so that the adaptor 208 can be bolted thereto. The horizontal leg 208b of the adaptor 208 is affixed to the tool base 207 by appropriate fasteners (not shown). A workpiece may be slidably supported by the front and rear work tables 22 and 30. A longitudinal workpiece guide 158 may be mounted on each of the tables to guide the movement of the workpiece. It will be understood that the workpiece cannot move downwardly because of the work tables 22 and 30. It cannot move sideways by virtue of the workpiece longitudinal guides 158. The workpiece cannot move upwardly because of the base 207 of circular saw 205. The workpiece is properly located for the cut by using the graduated dial 46 and screw 43 for front work table 22. The carriage assembly 69 is locked by locking mechanism 102 and therefore the circular saw is fixed. With the saw stationary, the workpiece is pushed past the sawblade to make a straight ripping cut. When the end of the workpiece being pushed approaches the base 207 of saw 205 the ripping cut can be completed by pulling the workpiece the rest of the way from the other side of the woodworking center. It will be understood that the saw blade may be angled with respect to saw base 207 to make a longitudinal angled ripping cut.

With the saw remaining stationary, the workpiece may be arranged transversely of front and rear work tables 22 and 30. The miter gauge 196 is placed in one of the longitudinal grooves 22a of front work table 22 and the workpiece is abutted thereagainst and engaged by the hold-down screw 196a of miter gauge 196. The miter gauge is used to push the workpiece past the saw blade to make a 90 degree cross cut. Depending upon the positioning of the circular saw with respect to its own base 207, the cross cut may be a vertical cross cut or an angled cross cut, as desired.

The saw blade may be tilted to a desired angle and the miter gauge may be swiveled to a desired angle. The miter gauge is used to push the workpiece past the sawblade to cut compound angles. In the alternative, the miter gauge 126 may be secured to front table 22 and the workpiece, abutting the miter gauge, may be secured by the miter gauge hold-down screw 196a. With the carriage locking assembly 120 released, the sawblade may be cranked through the workpiece to make a 90 degree vertical cross cut, a 90 degree tilted cross cut or a compound angle cross cut. The same cuts can be made in a similar fashion by manually pulling the carriage to cause the circular sawblade to pass through the workpiece, the carriage half-nut 105 having been withdrawn from screw 102.

Finally, the pair of transverse workpiece guides 160 may be located in the right hand transverse slots of front and rear tables 22 and 30, with the workpiece butted thereagainst. The workpiece can thereafter be cross cut by cranking the sawblade therethrough or by manually pulling the sawblade therethrough, depending upon whether or not half-nut 105 is engaged with screw 102. Again, the 90 degree cross cut may be a vertical cut or a tilted cut, depending upon the orientation of the sawblade. The circular saw, or any of the electric tools affixed to tool slide assembly 70 may be plugged into either one of the outlets 151 and 152 at the rear of the woodworking center. As indicated above, depending upon which of the outlets 151 and 152 is used, the tool will be turned on either by safety switch 155 of safety switch 156 at the ends of the woodworking center. At any time, the circular saw can be removed from the tool slide assembly 70 and used independently of the woodworking center.

Figure 27:
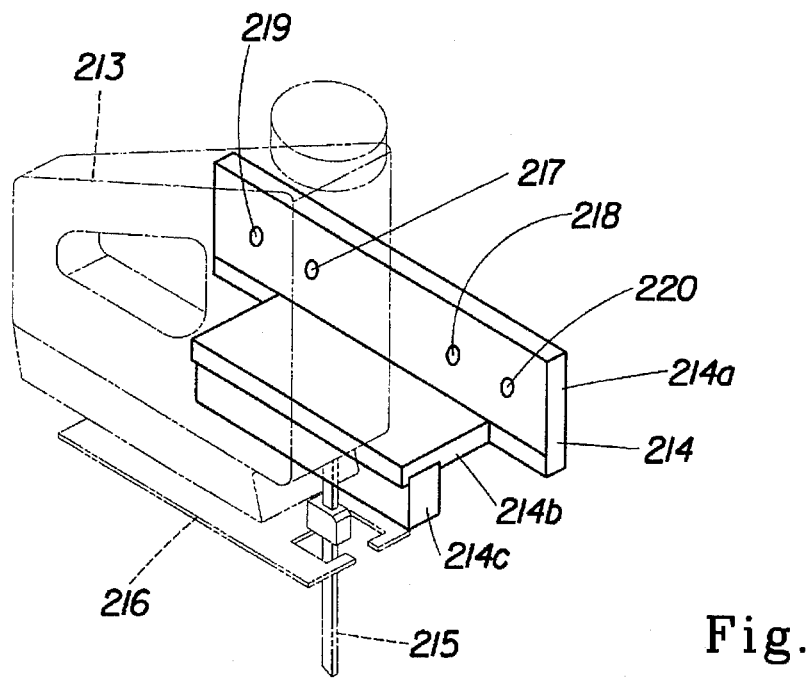
FIG. 27 is an isometric view of a saber saw and an adapter therefor by which the saber saw may be affixed to the vertical slide plate of the tool slide assembly.

FIG. 27 illustrates a saber saw 213 provided with an adapter 214 by which it may be affixed to the tool slide assembly 70. Saber saw 213, shown in phantom, is provided with a blade 215 and a base 216. The saw and its blade are tiltable with respect to saw base 216.

Adapter 214 is an L-shaped structure having a vertical leg 214a and a horizontal leg 214b. The horizontal leg 214b has a downwardly depending block 214c affixed thereto. The block 214c, in turn, is releasably fastened to the saber saw base 216 by appropriate fastening means (not shown). The vertical leg 214a of adapter 214 has a pair of locating pin receiving holes 217 and 218 and a pair of bolt receiving holes 219 and 220 so that it may be affixed to any corresponding set of threaded holes 126 and 127 and locating pins 130 and 131 of the vertical slide plate 125.

Saber saw 213 can be used to do any of the ripping and cross cutting operations described with respect to the circular saw. These operations can be performed in the same ways described with respect to the circular saw.

In addition, with the intermediate table in place and the proper reducing bushing located in the central counterbored perforation 35 of intermediate table 34, the intermediate table can be so located that the reducing bushing receives and accommodates the blade 215 of saber saw 213. The height of the saber saw base 216 from the surface of intermediate table 34 is adjusted by graduated dial 147 and screw 145 to accommodate the thickness of the workpiece. This having been done, contour sawing can be accomplished with a throat distance of 26". Both interior and exterior radii may be cut. If a predrilled hole is provided in the workpiece for blade access, saber saw 213 may cut internal circles or internal cutouts of other shapes.

Various sizes of square or rectangular openings may be made by predrilling holes at the four corners of the opening and using the graduated dials for the carriage assembly 69 and the front work table 22 for accurate movements of the workpiece during operation of the saber saw. The miter gauge 196 may be secured to front work table 22 and the workpiece may be secured with the miter gauge hold-down screw 196a whereby square or rectangular cutouts may be made in a first one of the longitudinal edges of the workpiece. If the saber saw blade is mined 90 degrees, square or rectangular cutouts may be made on the end of the workpiece. With the saber saw blade turned 180 degrees, square or rectangular cutouts may be made on the other longitudinal edge of the workpiece. The saber saw may, of course, be removed from the woodworking center at any time and used in a normal hand-held fashion.

Figure 28:
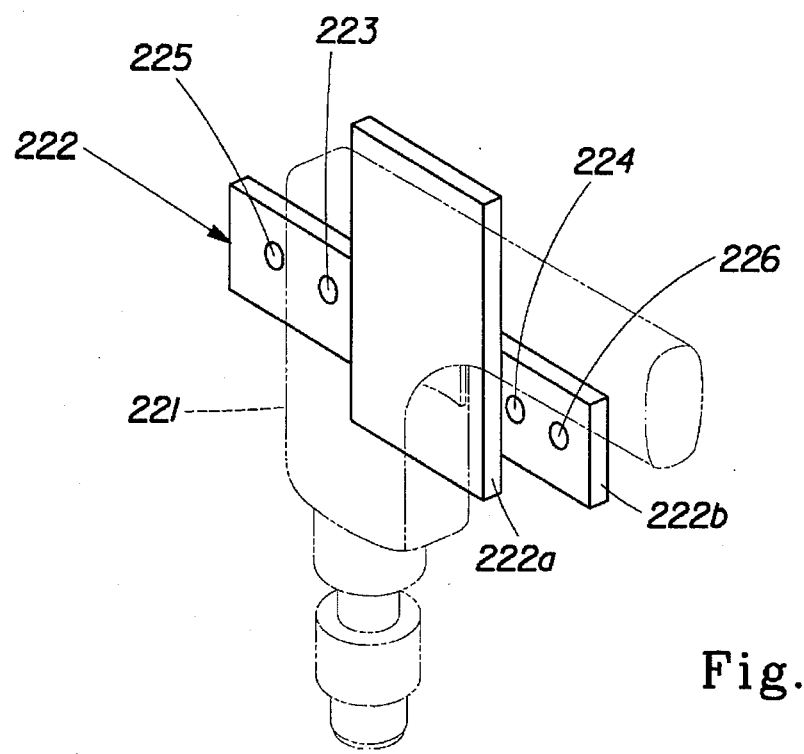
FIG. 28 is an isometric view illustrating an electric drill and an adapter therefor by which the electric drill may be affixed to the vertical slide plate of the tool slide assembly.

FIG. 28 illustrates an electric drill 221 having an adapter generally indicate at 222 affixed thereto. The adapter 222 comprises a first vertically oriented planar plate 222a affixed by machine screws (not shown) to the side of electric drill 222. The machine screws entering pre-existing threaded holes in the drill body normally used to hold the outside casing of the drill in place. The machine screws attaching plate 222a to the drill are provided with spacers such that when the plate 222a is vertically oriented, the tool and any drill bit located therein will also be vertically oriented. A second plate 222b is affixed to plate 222a and extends transversely thereof. The plate 222b has a pair of perforations 223 and 224 adapted to receive one pair of locating pins 130 and 131 of the vertical slide plate 125. Plate 222b is also provided with a second pair of holes 225 and 226 adapted to be coaxial with an appropriate pair of threaded holes 126 and 127 of vertical slide plate 125, whereby the adapter 222, carrying electric drill 221 can be bolted to vertical slide plate 125.

With the drill affixed to the vertical slide plate 125 of tool slide assembly 70, a bit placed in the drill will be vertically oriented and perpendicular to the surfaces of front and rear work tables 22 and 30. A workpiece may be secured between the front and rear work tables 22 and 30 by using the two longitudinal work guides 158 or by using the four workpiece clamping blocks described with respect to FIGS. 18, 19 and 20. For any given drilling operation, the center of the hole can be accurately located by moving the workpiece between the front and rear members of horizontal frame 3 through the use of the graduated dial 46 and its screw 43. The drill bit can be accurately located transversely of the woodworking center by means of screw 102 and either of its graduated dials 103 or 104. Finally, the depth of the drilling operation can be very accurately determined through the use of the graduated dial 147 and screw 145 of the tool slide assembly 70. The drilling operations may also include countersinking or counterboring. It will be understood that for most operations the work tables themselves will be clamped in position during the work operation, unless the front work table is used to move the workpiece into the tool.

The drill 221 and its adapter 222 may be affixed to the horizontal tool mounting plate 132 in the very same manner as they are affixed to the vertical slide plate 125. In this instance, a bit in the drill is horizontal and parallel to the surfaces of the work tables 22 and 30. With a workpiece clamped against a longitudinal workpiece guide 158 affixed to the front work table 22 holes can be drilled, countersunk or counterbored in the edge of the workpiece with the same accuracy described above. In this instance, the depth of the drilling operation is determined by manipulation of the graduated dial assembly 46 and screw 43 of the front work table. Vertical and longitudinal location of the hole to be drilled along the longitudinal edge is determined by manipulation of the graduated dial 147 and screw 148 of the vertical slide plate and manipulation of the screw 102 and one of its graduated dials 103 and 104. With the electric drill in its horizontal position, a 6 inch sanding disk can be located in the drill chuck and can be used to sand external radii.

It is also possible to locate the intermediate work table 34 between the front work table 22 and the rear work table 30. The drill, in its vertical position, may be provided with a sanding drum of selected size. The central counterbored hole 35 of the intermediate work table 34 will be provided with a reducing bushing having an internal diameter corresponding to the external diameter of the sanding drum. This set up may be used to perform contour edge sanding of an outside contoured edge of the workpiece or of an inside contoured edge of a cutout in the workpiece. As with the previously mentioned tools, the electric drill may at any time be removed from the woodworking center and used independently thereof.

Figure 29:
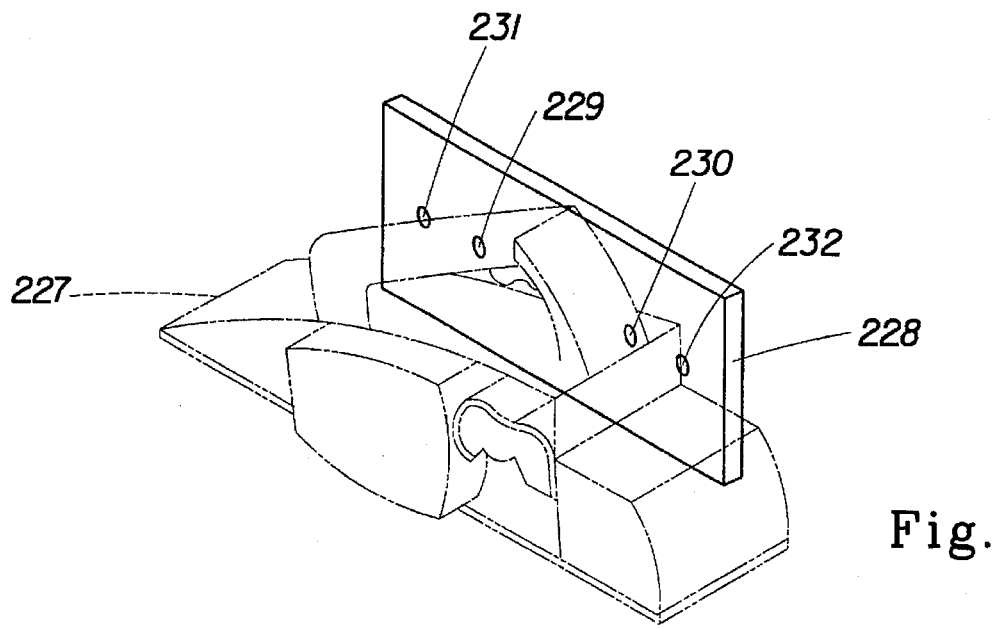
FIG. 29 is an isometric view of a planer and an adapter therefor by which the planer may be affixed to the vertical slide plate of the tool slide assembly.

In FIG. 29 a planer is shown in phantom lines at 227. The planer 227 is provided with an adapter 228 by which it may be affixed to the vertical slide plate 125 of the tool slide assembly 70. The plate 228 is attached to the side of the planer with machine screws and spacers (not shown) in the same manner described with respect to the attachment of plate 222a to drill 221 in FIG. 28. Adapter 228 is provided with a pair of perforations 229 and 230 adapted to receive any desired pair of corresponding locating pins 130 and 131 of vertical slide plate 125. The adapter plate 228 is also provided with perforations 231 and 232 by which it may be bolted in an appropriate corresponding pair of threaded perforations 126 and 127 of vertical side plate 125.

When the planer is attached to the vertical slide plate 125 its bottom will be horizontal and parallel with the top surfaces of the front and rear work tables 22 and 30. In this position, it can be used for flat or surface planing. When the workpiece is not longer than the carriage travel, the workpiece can be clamped in position, as for example between the pair of longitudinal workpiece guides 158 mounted on the front and rear work tables 22 and 30. The half-nut 105 of the carriage assembly 69 can be released from screw 102 and the carriage can be shifted back and forth from one end of the workpiece to the other while feeding the planer downwardly for desired stock removal by means of its graduated dial 147 and screw 145. In instances where the workpiece is longer than the carriage travel, the carriage half-nut 105 may be engaged with screw 102 and the carriage may be locked in place by carriage locking mechanism 120 so that the workpiece (guided rather than clamped by longitudinal workpiece guides 158 can be passed back and forth beneath the planer). Down feeding of the planer for desired stock removal is again accomplished by graduated dial 147 and screw 145 of vertical slide plate 125.

The planer 227 and its adapter 228 can be affixed to the horizontal tool mounting plate 132 in the same manner in which it is affixed to the vertical slide plate 125. When the planer 227 is affixed to horizontal tool mounting plate 132 its bottom surface lies in a vertical plane perpendicular to the top surfaces of work tables 22 and 30. In this position, the planer can be used for edge planing of workpieces to finish the edge or to achieve the desired width of the workpiece. When the workpiece is shorter than the carriage travel, the workpiece may be clamped on the front worktable 22 using a longitudinal guide 158 to align the workpiece. The carriage half-nut 105 may be disengaged from screw 102 and the carriage may be unlocked by releasing carriage locking mechanism 120 with the result that the carriage can be shifted back and forth across the workpiece. The graduated dial 46 and screw 43 of the front work table 22 can be used to feed the workpiece toward the planer. When the workpiece is longer than the carriage travel, the carriage can be locked at the mid-point of its travel. The half-nut 105 can be engaged with screw 102, and the carriage may be located in its mid-point position. Under these circumstances the workpiece can be pushed past the cutter head of the planer and the front work table 22 can be fed forwardly for successive passes by its graduated dial 46 and screw 43, until the desired width of the workpiece is obtained. The planer 227 and its adapter 228 may be attached to the tilting tool mount 175 which, in turn, is affixed on vertical slide plate 125. Under these circumstances, the planer can be angled downwardly toward the rear of the woodworking center and used to bevel the edges of a workpiece supported on the rear work table 30. Alternatively, the planer may be tilted upwardly to bevel the edges of a workpiece mounted in the manner illustrated in FIG. 20.

With the planer mounted directly to the horizontal tool mounting plate 132, in position for edge planing, the miter gauge 196 may be secured to the front work table and the workpiece held in place with the miter gauge hold down screw 196a. In this way, the surfaces of 90 degree cross cuts can be planer. The miter gauge may be swiveled to permit planing of angled cross cuts. The miter gauge can also be swiveled to allow the planing of various bevels on the corner of a workpiece. Again, it will be understood that the planer can be removed from the woodworking center at any time and used in a normal hand-held fashion.

Figure 30:
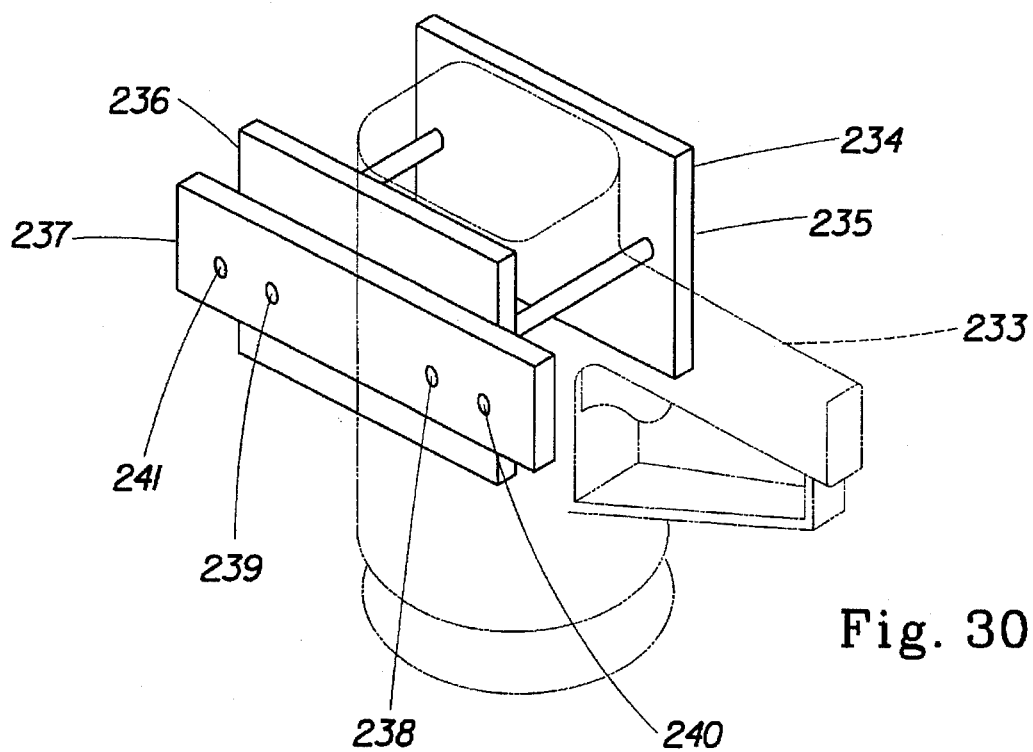
FIG. 30 is an isometric view of an orbital sander and an adapter therefor by which the orbital sander may be affixed to the vertical slide plate of the tool slide assembly.

FIG. 30 illustrates in phantom an orbital disk sander 233 provided with an adapter 234 shown in solid lines. The adapter 234 comprises a pair of plates 235 and 236 located to either side of the orbital sander 233 and affixed thereto and to each other with machine screws and spacers in the same manner described with respect to plate 222a of FIG. 28. The plate 236 of adapter 235 has affixed thereto yet another plate 237. The plate 237 is provided with perforations 238 and 239 adapted to receive a pair of locating pins 130 and 131 of vertical slide plate 225. The plate 237 also has a pair of holes 240 and 241 adapted to match with an appropriate pair of threaded holes 126 and 127 of the vertical slide plate 125 so that the orbital sander and its adapter can be bolted to the vertical slide plate 125 of tool slide assembly 70. In a similar fashion, the orbital sander 233 and its adapter 234 can be affixed to the horizontal tool mounting plate 132 of the tool slide assembly 70. It will be understood that the orbital sander can be used in precisely the same ways described with respect to the router to sand the same edges, bevels, corners and the like with the relative movements of the orbital sander and the workpiece being the same and being accomplished in the same manner using the graduated dials 44, 103, 104 and 147. As in the case of the other tools discussed above, the orbital sander can be removed from the woodworking center and used independently thereof.

Figure 31:
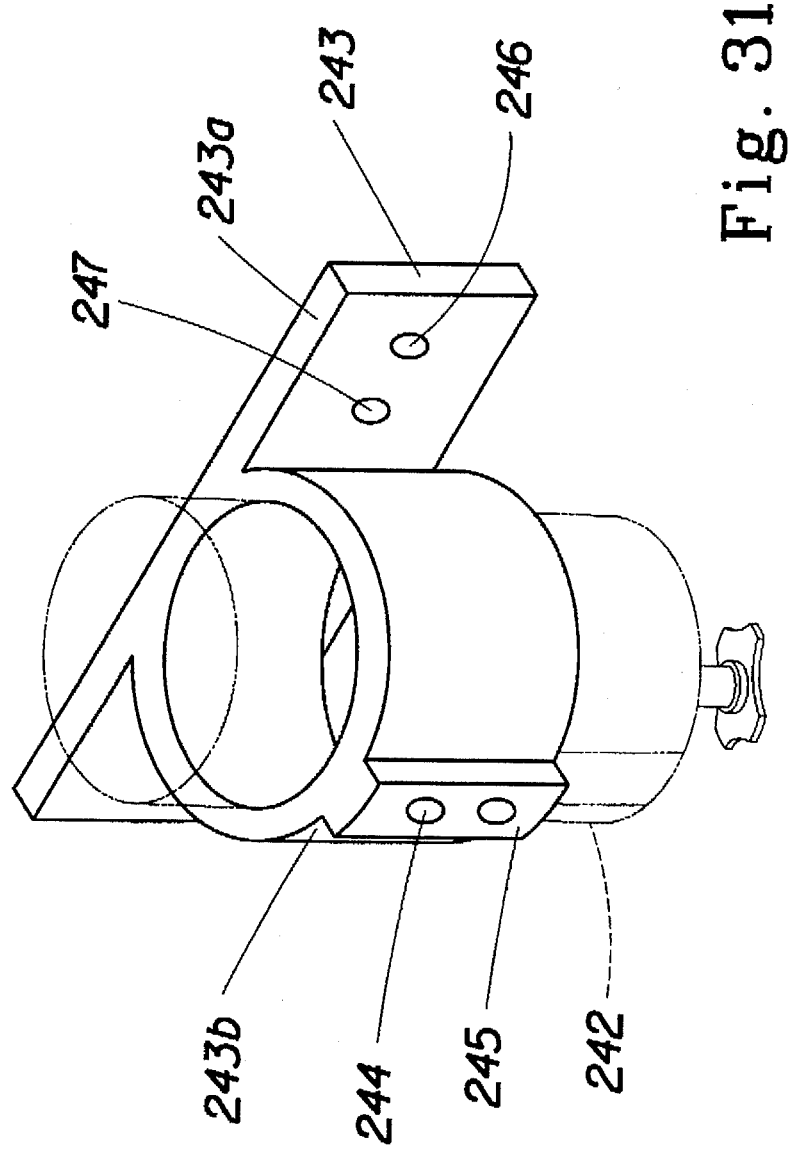
FIG. 31 is an isometric view of a router and an adapter therefor by which the router may be affixed to the vertical slide plate of the tool slide assembly.

FIG. 31 illustrates in phantom line a router 242 mounted in an adapter 243. Adapter 243 comprises a plate 243a with a cylindrical ring 243b affixed thereto. The router 242, with its base removed, is inserted in the ring 243b and is engaged and held therein by machine screws 244 and 245. The plate-like portion 243a of adapter 243 is provided with a series of bolt receiving holes and pin receiving holes (two of which are shown at 246 and 247) identical to the holes 238–241 of FIG. 30, by which adapter 243 and router 242 can be attached to the vertical slide plate 125 of tool slide assembly 70.

With the router mounted on the vertical slide plate 125 grooves of various sizes, shapes and depths can be cut lengthwise and crosswise on the workpiece. Depending upon the router bits chosen, the grooves can be of square, rectangular, V-shaped or rounded cross section and of different sizes and depths. The grooves can be accurately spaced using the graduated dials 44 of front table 22 or 103 or 104 of carriage assembly 69.

Through the use of roundover bits, cove bits, and the like the longitudinal and end edges of the workpiece can be given various configurations.

By plunging the cutter downwardly into the workpiece, square or rectangular pockets of different sizes and depths can be milled in the workpiece. By plunging the cutter through the thickness of the workpiece, different sizes of square or rectangular openings can be made. The rounded corners left by the router bit can be squared by using a saber saw. By using a straight flute router bit and feeding down and over, rabbits of any width and depth can be made.

With the workpiece held in an upright position as shown in FIG. 20, and the router mounted on the vertical slide plate 125, longitudinal or transverse grooves can be cut in the workpiece edge, or various edge patterns can be created.

The router 242 can be mounted on the horizontal tool mounting plate 132 in the same manner in which it is affixed to vertical slide plate 125. With the router 242 mounted on the horizontal tool mounting plate 132 and a workpiece clamped to front work table 22, it is possible to do tongue and groove operations. with formed router bits different edge patterns can be created. By feeding the router bit downwardly through the thickness of the workpiece, square, rectangular, "V"-shaped or round configurations can be accomplished. Accurate depths can be achieved by use of the front work table graduated dial 44 and repeated accurate spacing can be achieved by use of either of the carriage graduated dials 103 and 104. Edge patterns on workpieces longer than the carriage travel can be accomplished by locking the carriage at mid point and feeding the workpiece past the tooling with a longitudinal guide 158 used in one of the work table grooves 22a to guide the workpiece.

The router 242 may be attached to the tilting tool mount, and the tilting tool mount may be attached to the vertical slide plate 125. With the workpiece held horizontally on the rear work table 30 or held upwardly as illustrated in FIG. 20, various types of beveled edge work at various angles can be performed. With the router removed from its adapter, its base can be remounted on the router, and the router can be used to perform traditional hand-held routing operations.

Figure 32:
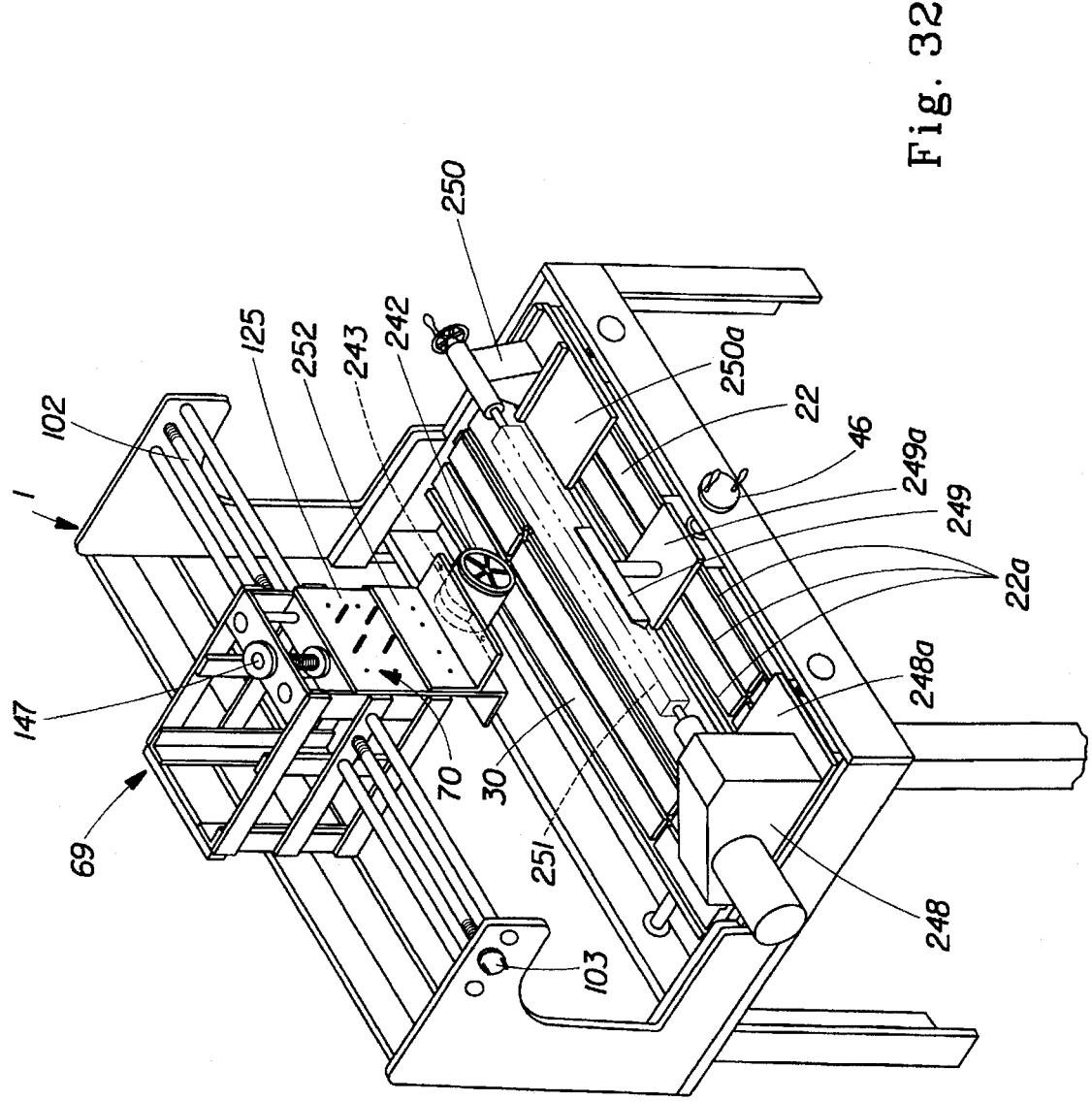
FIG. 32 is a simplified isometric view of the woodworking center provided with the headstock, tool support and tailstock of a lathe.

FIG. 32 is a simplified isometric view of the woodworking center provided with a headstock 248, a tool rest 249 and a tailstock 250. The headstock 248, the tool rest 249 and the tailstock 250 are provided with adapter bases 248a, 249a and 250a, respectively. The bases are drilled in such a way that the headstock 248, tool rest 249 and tailstock 250 can be attached to front work table 22 by socket head cap screws entering selected ones of the holes 22c in longitudinal grooves 22a (see also FIG. 12). With this set up, all of the usual wood lathe work functions can be performed using traditional hand-held tooling. The lathe assembly can accommodate a 31" workpiece, as indicated at 251 in broken lines.

The adapter base 248a of headstock 248 and the adapter base 150a of tailstock 250 are so designed and drilled as to permit mounting of the headstock 248 at the right end of the woodworking center and the tail stock 250 at the left end thereof. This arrangement reverses the rotation of the lathe spindle, as compared to the set up shown in FIG. 32. The tool support 249 is removed and the router 242 is mounted in its adapter 243. An angle adapter 252 is provided having a horizontal leg to which the router 242 and its adapter are attached. The vertical leg of the angle adapter 242 is provided with perforations enabling it to be engaged on the locator pins and bolted into the threaded perforations of the vertical slide plate 125 of slide assembly 70 of carriage assembly 69. It will be noted that the router 242 faces the front of the woodworking center.

With this set up, all of the cylinder turning operations can be performed using router bits to do the turning. Both the headstock 248 and the router 242 are preferably connected to the same outlet 151 or 152. As a result of this, both the router 242 and the headstock 248 will be turned on and off simultaneously by one of safety switch 155 or 156, depending upon which of the outlets 151 and 152 was chosen.

The turning operations are performed by feeding the router bit down to the center line of workpiece 251 by means of graduated dial 147 and screw 145. By means of screw 102 and either one of its graduate dials 103 and 104 the carriage assembly 167 is moved to the end of the workpiece 251. The front work table 22 is moved inwardly for the desired depth of cut by graduated dial 44 and screw 43 and is locked in position. The headstock 241 and router 242 are turned on and the carriage assembly 67 is moved along the entire length of the workpiece by screw 102 and either one of its graduated dials 103 and 104. This is an excellent situation for the use of crank handle 200 of FIG. 25.

After the turning operations are complete, the woodworking center is capable of performing precision grooving operations by using a variety of router bits. Accurate depth and spacing of the grooves can be accomplished by using the front work table zero collar 50 and graduated dial 44 and one of the zero collar and graduated dials 103 and 104 of carriage screw 102. Grooving on the workpiece is done by touching the router bit to the workpiece at the center line then cranking the router upwardly. The front work table is shifted rearwardly by an amount to establish the desired depth of the groove. The headstock 248 and router 242 are turned on and the router is fed downwardly just beyond the center line of the workpiece and then back up until the router bit clears the workpiece. Square, rectangular, V-shaped or rounded grooves can be made along the length of the workpiece, depending upon the choice of router blades.

Step turning can be accomplished by locating the router bit at the desired location and cranking the front work table 22 inwardly to plunge cut the workpiece to the desired diameter. Thereafter, the carriage assembly 69 is cranked the desired distance. Straight flute router bits will leave a square corner, while a rounded bit will be used to create a rounded corner.

The woodworking center is also capable of face plate work using router bits to do the cutting. A disk-like workpiece (up to 12" in diameter) is mounted on the face plate and the lathe headstock 248 is turned 90 degrees to face the router 242. The tailstock 250 may be removed from the woodworking center 1.

The headstock 248 is properly aligned by using the right hand transverse groove 22b of front table 22 and is held in place by four socket head cap screws, using the threaded holes 22c in front work table 22. The router 242 is cranked downwardly and horizontally to the center of the workpiece. By moving front work table 22 forwardly, the router bit is plunged into the workpiece the desired depth. Front work table 22 is then locked in place and the carriage assembly 69 is shifted by screw 102 and either one of graduated dials 103 and 104 to establish the desired inside diameter of the workpiece. Repeated facing cuts can be made to establish the desired depth. Straight flute or rounded router bits can be used to create a square or rounded edge. The same procedure can be performed in the same manner where the left transverse groove 22b of front work table 22 is used to align headstock 248. It should be noted that use of a router is much safer than the conventional use of hand held tooling.

The above described tools and their functions are exemplary only. Additional tools may also be used to perform additional functions. A belt sander, a scroll saw, and a multi-purpose power tool such as that produced by DREMEL™ are some of the additional tools which could be adapted for use on the woodworking center 1. From the above it will be apparent that a great many operations may be performed with high precision and with precise repeatability utilizing readily available portable powered hand tools.

Modifications may be made in the invention without departing from the spirit of it.

What is claimed is:

1. A woodworking center comprising a horizontal rectangular frame having front, rear and side members, said frame being supported by one of a set of legs and a bench, a horizontal, workpiece supporting, worktable assembly located within said frame and having front and rear edges respectively parallel to said front and rear members of said frame, a first precision moving device that shifts said worktable assembly along a path of travel between and perpendicular to said front and rear frame members, locking assemblies that lock said worktable assembly at any desired position along said worktable path of travel, a head comprising a carriage and a tool supporting slide assembly, said carriage and said slide assembly being located above said worktable assembly and shiftable horizontally along a path of travel extending above and perpendicular to said frame side members, said carriage and said slide assembly being shiftable by hand and by a second precision moving device along said carriage and said slide assembly path of travel, a locking assembly that locks said carriage and said slide assembly at any desired position along said carriage and slide assembly path of travel, a wide variety of portable power hand tools being affixable to said slide assembly, a third precision moving device that shifts said slide assembly along a vertical slide assembly path of travel on said carriage, a locking assembly that locks said slide assembly at any desired position along said slide assembly path of travel, whereby said carriage, said slide assembly, and said worktable assembly are capable of accurately and repeatably moving and locating a tool and a workpiece to accomplish a wide variety of woodworking operations.

2. The woodworking center claimed in claim 1 wherein said worktable assembly comprises a front worktable and a rear worktable, a pair of parallel, horizontal, spaced worktable guide rods mounted on and extending between and perpendicular to said frame front and rear members, said front and rear worktables being slidably and captively mounted on said worktable guide rods, an intermediate worktable slidably and removably mounted on said worktable guide rods and locatable between said front and rear worktables, said intermediate worktable having transverse extensions which engage beneath said front and rear worktables to prevent removal of said intermediate worktable when said front, rear, and intermediate worktables are in abutting relationship, said rear and said intermediate worktable being manually shiftable along said worktable guide rods, said front worktable being shiftable therealong by said first precision moving device.

3. The woodworking center claimed in claim 1 including a pair of upstanding supports mounted on said frame sides, a pair of carriage guide rods affixed to and extending between said upstanding supports in parallel spaced relationship and parallel to said front and rear members of said horizontal frame, said carriage guide rods passing through bushed holes in said carriage slidably supporting said carriage above said worktable assembly, a carriage adjustment screw comprising said second precision moving device and extending between and parallel to said carriage guide rods, said carriage adjustment screw passing through bushed holes in said carriage, extending through said upstanding supports, and terminating in free ends of reduced diameter, each of said free ends of said carriage screw having a rotatable assembly for rotating said carriage screw, a half nut mounted in said carriage and being shiftable between a first position wherein it is engaged with said carriage screw and a second position wherein it is disengaged with said carriage screw, whereby when said half nut is in said second position said carriage may be moved along said carriage guide rods manually and when said half nut is in said first position said carriage can be moved in a precision manner by said carriage adjustment screw and one of said rotatable assemblies at either end of said carriage adjustment screw, and a set screw on said carriage engageable with one of said carriage guide rods to lock said carriage in any desired position along said guide rods.

4. The woodworking center claimed in claim 1 wherein said tool supporting slide assembly comprises a vertical, rectangular, planar, tool mounting plate having top, bottom and side edges and front and rear surfaces, and a horizontal, rectangular, planar tool mounting plate extending rearwardly from said bottom edge of said vertical tool mounting plate, said carriage supporting a pair of vertically oriented slide assembly guide rods which define said slide assembly path of travel and to which said slide assembly is captively and slideably mounted for vertical movement, said means to lock said slide assembly at any desired position along said slide assembly path of travel comprises a set screw mounted on said slide assembly and engageable with said carriage to releasably lock said slide assembly, said slide assembly being moveable along said slide assembly guide rods by said third precision moving device.

5. The woodworking center claimed in claim 1 wherein said portable power tools comprise a circular saw, a saber saw, a planer, an orbital disk sander, a router, a lathe and drill.

6. The woodworking center claimed in claim 2 including a locking assembly for the ends of said front and rear worktables adjacent and parallel to each of said side members of said horizontal frame, said locking assemblies each comprising an elongated slotted locking bar adjustably affixed to said front and rear frame members of said horizontal frame adjacent its respective one of said frame side members, each of said front and rear worktables having an extension at each of its ends located beneath the adjacent one of said slotted locking bars, each worktable extension having a clamp plate mounted thereon with a threaded perforation therein underlying a slot of the adjacent one of said elongated locking bars, screws passing through said slots of said locking bars and engaged in said threaded holes in said clamp plates, whereby when said front and rear worktables are located as desired and said screws are tightened, said worktables are locked in position.

7. The woodworking center claimed in claim 2 wherein said front and rear worktables each have a series of spaced longitudinal grooves therein, each having a bottom with threaded holes formed therein and evenly spaced therealong, elongated longitudinal workpiece guides being provided for mounting in said longitudinal grooves, a transverse groove located near each end of each of said front and rear worktables, said transverse grooves each having a bottom with threaded holes formed therein and evenly spaced therealong, transverse workpiece guides being mountable in said transverse grooves.

8. The woodworking center claimed in claim 2 wherein said intermediate worktable has at its longitudinal and transverse center a counterbored perforation therethrough, a plurality of different size-reducing bushings being provided for mounting in said counterbored perforation.

9. The woodworking center claimed in claim 2 wherein said first precision moving device for said front worktable comprises an adjustment screw engaged in a nut affixed beneath said front worktable, passing through said front member of said horizontal frame, and terminating in a free end of reduced diameter, a rotatable assembly on said free end of said adjustment screw for rotating said adjustment screw to shift said front worktable along said worktable guide rods a desired distance in a precision manner.

10. The woodworking center claimed in claim 9 wherein said rotatable assembly for rotating said front worktable adjustment screw comprises a bushing in which said free end of said front table adjustment screw is rotatively mounted, a flanged cylindrical back-up plate affixed to said frame front member with said bushing and said adjustment screw free end mounted therein, said free end of said front worktable adjustment screw being non-rotatively affixed to a disk-like dial abutting said flanged cylindrical back-up plate, said dial having a peripheral edge of a diameter substantially the same as the diameter of said flange of said cylindrical back-up plate, said peripheral edge of said dial having graduations thereon, an annular collar rotatively mounted on said cylindrical back-up plate between said flange and said dial and having a zero mark thereon, said zero mark being alignable with any of said disk graduations, a set screw extending through said annular collar and engageable with said cylindrical back-up plate to fix the rotative position of said annular collar and its zero mark with respect to said backup plate, said graduations being based on the linear distance movement of said front table caused by one revolution of said adjustment screw, said graduations being in one of the English and the metric systems.

11. The woodworking center claimed in claim 10 wherein said system is the English system, said worktable adjustment screw and said front worktable nut have left hand Acme threads, four threads per inch, such that one revolution of said front table adjustment screw shifts said front table along said worktable guide rods by ¼ inch, said graduations on said periphery of said dial comprise four ¹⁄₁₆ inch graduations, eight ¹⁄₃₂ inch graduations, and sixteen ¹⁄₆₄ inch graduations.

12. The woodworking center claimed in claim 3 wherein said rotatable assemblies at either end of said carriage adjustment screw are identical, each rotatable assembly comprising a bushing in which the adjacent one of said free ends of said carriage adjustment screw is rotatively mounted, a ranged cylindrical back-up plate affixed to the adjacent one of said upstanding supports with said bushing mounted therein, said adjacent free end of said carriage adjustment screw being non-rotatively affixed to a disk-like dial abutting said ranged cylindrical back-up plate, said dial having a peripheral edge of a diameter substantially the same as the diameter of said flange of said cylindrical back-up plate, said peripheral edge of said dial having graduations thereon, an annular collar rotatively mounted on said cylindrical back-up plate between said flange and said dial and having a zero mark thereon, said zero mark being alignable with any of said disk graduations, a set screw extending through said annular collar and engageable with said cylindrical back-up plate to fix the rotative position of said annular collar and its zero mark with respect to said back-up plate, said graduations being based on the linear distance movement of said carriage caused by one revolution of said carriage adjustment screw, said graduations being in one of the English and the metric systems.

13. The woodworking center claimed in claim 12 wherein said system is the English system, said carriage adjustment screw and said half nut having left hand Acme threads, four threads per inch, such that one revolution of said carriage adjustment screw shifts said carriage along said carriage guide rods by ¼ inch, said graduations on said periphery of said dial comprising four ¹⁄₁₆ inch graduations, eight ¹⁄₃₂ inch graduations, and sixteen ¹⁄₆₄ inch graduations.

14. The woodworking center claimed in claim 4 wherein said third precision moving device for said slide assembly comprises a slide assembly adjustment screw engaged in a nut affixed to said slide assembly, passing through a portion of said carriage, and terminating in a free end of reduced diameter, a rotatable assembly on said free end of said slide assembly adjustment screw for rotating said adjustment screw to shift said slide assembly a desired distance along said slide assembly guide rods in a precision manner.

15. The woodworking center claimed in claim 14 wherein said rotatable assembly for rotating said slide assembly adjustment screw comprises a bushing in which said reduced diameter free end of said slide assembly adjustment screw is rotatively mounted, a flanged cylindrical back-up plate affixed to said carriage portion with said bushing mounted therein, said free end of said slide assembly adjustment screw being non-rotatively affixed to a disk-like dial abutting said flanged cylindrical back-up plate, said dial having a peripheral edge of a diameter substantially the same as the diameter of said flange of said cylindrical back-up plate, said peripheral collar rotatively moving graduations thereon, an annular collar rotatively mounted on said cylindrical back-up plate between said flange and said dial and having a zero mark thereon, said zero mark being alignable with any of said disk graduations, a set screw extending through said annular collar and engageable with said cylindrical back-up plate to fix the rotative position of said annular collar and its zero mark with respect to said back-up plate, said graduations being based on the linear distance movement of said slide assembly caused by one revolution of said slide assembly adjustment screw, said graduations being in one of the English and the metric systems.

16. The woodworking center claimed in claim 15 wherein said system is the English system, said slide assembly adjustment screw and nut having left hand Acme threads, four threads per inch, such that one revolution of said slide assembly adjustment screw shifts said slide assembly along said slide assembly guide rods by ¼ inch, said graduations on said periphery of said dial comprising four ¹⁄₁₆ inch graduations, eight ¹⁄₃₂ inch graduations, and sixteen ¹⁄₆₄ inch graduations.

17. The woodworking center claimed in claim 10 including a pair of upstanding supports mounted on said frame sides, a pair of carriage guide rods affixed to and extending between said upstanding supports in parallel spaced relationship and parallel to said front and rear members of said horizontal frame, said carriage guide rods passing through bushed holes in said carriage slidably supporting said carriage above said table assembly, a carriage adjustment screw comprising said second precision moving device and extending between and parallel to said carriage guide rods, said carriage adjustment screw passing through bushed holes in said carriage, extending through said upstanding supports, and terminating in free ends of reduced diameter, each of said free ends of said carriage screw having a rotatable assembly for rotating said carriage screw, a half nut mounted in said carriage and being shiftable between a first position wherein it is engaged with said carriage screw and a second position wherein it is disengaged with said carriage screw, whereby when said half nut is in said second position said carriage may be moved along said carriage guide rods manually and when said half nut is in said first position said carriage can be moved in a precision manner by said carriage adjustment screw and one of said rotatable assemblies at either end of said carriage adjustment screw, and a set screw on said carriage engageable with one of said carriage guide rods to lock said carriage in any desired position along said guide rods.

18. The woodworking center claimed in claim 17 wherein said rotatable assemblies at either end of said carriage adjustment screw are identical, each rotatable assembly comprising a bushing in which the adjacent one of said reduced diameter free ends of said carriage adjustment screw is rotatively mounted, a flanged cylindrical back-up plate affixed to the adjacent one of said upstanding supports with said bushing mounted therein, said adjacent free end of carriage adjustment screw being non-rotatively affixed to a disk-like dial abutting said ranged cylindrical back-up plate, said dial having a peripheral edge of a diameter substantially the same as the diameter of said flange of said cylindrical back-up plate, said peripheral edge of said dial having graduations thereon, an annular collar rotatively mounted on said cylindrical back-up plate between said flange and said dial and having a zero mark thereon, said zero mark being alignable with any of said disk graduations, a set screw extending through said annular collar and engageable with said cylindrical back-up plate to fix the rotative position of said annular collar and its zero mark with respect to said back-up plate, said graduations being based on the linear distance movement of said carriage caused by one revolution of said carriage adjustment screw, said graduations being in one of the English and the metric systems.

19. The woodworking center claimed in claim 18 wherein said tool supporting slide assembly comprises a vertical, rectangular, planar, tool mounting plate having top, bottom and side edges and front and rear surfaces, and a horizontal, rectangular, planar tool mounting plate extending rearwardly from said bottom edge of said vertical tool mounting plate, said carriage supporting a pair of vertically oriented slide assembly guide rods which define said slide assembly path of travel and to which said slide assembly is captively and slideably mounted for vertical movement, said means to lock said slide assembly at any desired position along said slide assembly path of travel comprises a set screw mounted on said slide assembly and engageable with said carriage to releasably lock said slide assembly, said slide assembly being moveable along said slide assembly guide rods by said third precision moving device.

20. The woodworking center claimed in claim 19 wherein said third precision moving device for said slide assembly comprises a slide assembly adjustment screw engaged in a nut affixed to said slide assembly, passing through a portion of said carriage, and terminating in a free end of reduced diameter, a rotatable assembly on said free end of said adjustment screw for rotating said adjustment screw to shift said slide assembly a desired known distance along said slide assembly guide rods in a precision manner.

21. The woodworking center claimed in claim 20 wherein said rotatable assembly for rotating said slide assembly adjustment screw comprises a bushing in which said reduced diameter free end of said slide assembly adjustment screw is rotatively mounted, a flanged cylindrical back-up plate affixed to said carriage portion with said bushing mounted therein, said free end of said slide assembly adjustment screw being non-rotatively affixed to a disk-like dial abutting said flanged cylindrical back-up plate, said dial having a peripheral edge of a diameter substantially the same as the diameter of said flange of said cylindrical back-up plate, said peripheral edge of said dial having graduations thereon, an annular collar rotatively mounted on said cylindrical back-up plate between said flange and said dial and having a zero mark thereon, said zero mark being alignable with any of said disk graduations, a set screw extending through said annular collar and engageable with said cylindrical back-up plate to fix the rotative position of said annular collar and its zero mark with respect to said back-up plate, said graduations being based on the linear distance movement of said slide assembly caused by one revolution of said slide assembly adjustment screw, said graduations being in one of the English and the metric systems.

22. The woodworking center claimed in claim 21 wherein said portable power tools comprise a circular saw, a saber saw, a planer, an orbital disk sander, a router, and a drill.

23. The woodworking center claimed in claim 22 including at least one electrical outlet on said woodworking center to which said power tools may be connected, said at least one electrical outlet being connected to a source of power through a safety switch mounted on said woodworking center.

24. The woodworking center claimed in claim 22 including two electrical outlets on said woodworking center to which said power tools may be connected, a pair of safety switches, said electrical outlets each being connected to a source of power through one of said safety switches, said safety switches being mounted on said side members of said frame, respectively.

25. The woodworking center claimed in claim 23 including a tilting tool mount, said tilting tool mount comprising a first planar rectangular base member affixable to said vertical tool mounting plate and extending transversely thereof, said first base member terminating in forwardly extending arms, a second planar rectangular base member terminating in rearwardly extending arms, said arms of said second base member being located between and adjacent said first base member arms forming two pairs of adjacent arms, said arms of said adjacent pairs being pivoted together, the outer arms of said pairs each having all accurate slot formed therein, the inner arms of said pairs each having a threaded bore aligned with said arcuate slot of its respective outer arm, a machine screw passing through each of said slots and being threadedly engaged in the adjacent one of said threaded bores, said second base member being pivotable through an arc determined by said arcuate slots from a position wherein said second base member lies at an angle of 45° to the horizontal and slopes toward the front of the woodworking center, to a position wherein said second base member lies at an angle of 45° to the horizontal and slopes toward the rear of said woodworking center, said second base member having an outside surface constituting a tool mounting surface.

26. The woodworking center claimed in claim 25 wherein each of said power tools is provided with an adapter whereby it may be attached to any one, any two, or all of said vertical tool mounting plate, said horizontal tool mounting plate and said tilting tool mount, depending upon the power tool used and the nature of the woodworking operation.

27. The woodworking center claimed in claim 21 including a headstock, a tool rest and a tailstock of a lathe mountable on said front work table, said headstock being affixable to either end of said front work table and said tailstock being affixable to an end of said table opposite said headstock, and ends at which said headstock and said tailstock are mounted determining the direction of rotation of a workpiece mounted therebetween, said workpiece being shaped by one of hand tools and a router mounted on said head.

28. The woodworking center claimed in claim 21 including a lathe headstock mountable at either end of said front work table and facing said head, a router mounted on said head whereby to do face plate work on a disk-like workpiece mounted on said headstock.

29. The woodworking center claimed in claim 21 including an auxiliary crank for rapidly mining said graduated dials of said front work table adjustment screw, said carriage adjustment screw and said slide assembly adjustment screw, said crank comprising a bar having first and second sides, a peripheral edge and first and second ends, a crank handle mounted near said first end of said bar and extending perpendicularly from said first side thereof, a pair of tubular members mounted near said bar second end and extending perpendicularly from said second side of said bar, each of said graduated dials having a pair of diametrically located handles extending perpendicularly therefrom, said tubular members being sized and positioned to receive said handles of any one of said graduated disks with a sliding fit, said tubular members each having a threaded perforation, a thumb screw in each of said threaded perforations of said tubular members to engage its respective one of said handles of said graduated disk whereby to releaseably lock said auxiliary crank thereto.

30. The woodworking center claimed in claim 21 wherein said front and rear work tables each have a series of spaced, parallel, longitudinal grooves therein, each groove having a bottom with threaded holes formed therein and evenly spaced therealong, a transverse groove near each end of each of said front and rear work tables, said transverse grooves being parallel and each having a bottom with threaded holes formed therein and evenly spaced therealong.

31. The woodworking center claimed in claim 30 including at least two elongated longitudinal workpiece guides locatable in any of said longitudinal grooves of said front and rear work tables, said longitudinal workpiece guides having perforations therethrough, and spaced therealong at the same spacing as said longitudinal groove threaded holes, said longitudinal workpiece guides each being fastenable within said longitudinal grooves by at least one threaded fastener passing through one of said perforations therein and threaded into one of said threaded holes of said longitudinal grooves.

32. The woodworking center claimed in claim 30 including at least two transverse workpiece guides locatable in any of said transverse grooves in said front and rear work tables, said transverse workpiece guides having perforations therethrough and spaced therealong at the same spacing as said transverse groove threaded holes, said transverse workpiece guides each being fastenable within said transverse grooves by at least one threaded fastener passing through one of said perforations therein and threaded into one of said threaded holes of said transverse grooves.

33. The woodworking center claimed in claim 30 including at least two pairs of identical clamp blocks, each clamp block comprising an elongated block having a first pair of opposite sides comprising work table contacting sides each bisected longitudinally by a central longitudinal flange, each longitudinal flange being sized to be received in any of said longitudinal grooves of said front and rear work tables, a central perforation passing perpendicularly through said central longitudinal flanges for receipt of a threaded fastener passing therethrough and threadedly engaged in one of said threaded perforations of said worktable longitudinal grooves to removably affix said clamp block therein, said clamp block having a second pair of opposite workpiece engaging sides, each said sides of said second pair at each longitudinal edge thereof having an off-set, all four of said off-sets being differently sized to accommodate workpieces of four different thicknesses.

34. The woodworking center claimed in claim 30 including a plurally of identical clamp bars, each clamp bar having a central perforation for receipt of a threaded fastener whereby said clamp bar may be caused to overlie a workpiece and be affixed to one of said front and rear work tables by said threaded fastener threadedly engaged in one of said groove or slot threaded holes.

35. The woodworking center claimed in claim 34 including a miter gauge having a hold-down screw thereon, said miter gauge having an elongated member slidably receivable in any of said longitudinal grooves and transverse slots of said front and rear work tables, said elongated member of said miter gauge having holes therealong at the same spacing as said threaded holes of said longitudinal work table grooves.

36. The woodworking center claimed in claim 8 wherein said size-reducing bushings are sized to accommodate different sized sanding drums.

* * * * *

UNITED STATES PATENT AND TRADEMARK OFFICE
CERTIFICATE OF CORRECTION

PATENT NO. : 5,653,273
DATED : August 5, 1997
INVENTOR(S) : Emin Nelson Bach

It is certified that error appears in the above-indentified patent and that said Letters Patent is hereby corrected as shown below:

Column 24, line 40 (claim 5) delete "drill" and insert therefor --drills.--

Column 25, line 52 (claim 12), "ranged" shoudl read --flanged--

Column 25, line 56 (claim 12), "ranged" should read --flanged--

Column 26, line 32 (Claim 15), delete "collar rotatively moving" and insert therefor --edge of said dial having--

Column 27, line 22 (claim 18), "ranged" should read --flanged--

Column 29, line 13 (claim 29), "mining" should read --turning--

Signed and Sealed this

Sixteenth Day of December, 1997

Attest:

BRUCE LEHMAN

Attesting Officer

Commissioner of Patents and Trademarks